United States Patent [19]

Kohtani et al.

[11] 4,274,718
[45] Jun. 23, 1981

[54] SOUND MOTION PICTURE CAMERA

[75] Inventors: Yutaka Kohtani; Yoshio Komine, both of Yokohama, Japan

[73] Assignee: Canon Kabushiki Kaisha, Tokyo, Japan

[21] Appl. No.: 89,453

[22] Filed: Oct. 30, 1979

Related U.S. Application Data

[63] Continuation of Ser. No. 961,766, Nov. 17, 1978, abandoned.

[30] Foreign Application Priority Data

Nov. 18, 1977 [JP] Japan ............................... 52-139267
Oct. 13, 1978 [JP] Japan ............................... 53-126564

[51] Int. Cl.³ ........................................... G03B 31/02
[52] U.S. Cl. ............................... 352/14; 352/29; 352/72; 352/180
[58] Field of Search ....................... 352/14, 26, 27, 29, 352/30, 72, 174, 175, 180, 191

[56] References Cited

U.S. PATENT DOCUMENTS

| | | | |
|---|---|---|---|
| T920,009 | 3/1974 | Kosarko | 352/29 |
| 3,982,826 | 9/1976 | Saito | 352/14 |
| 4,003,643 | 1/1977 | Freudenschuss et al. | 352/14 |
| 4,148,566 | 4/1979 | Freudenschuss et al. | 352/14 |
| 4,148,570 | 4/1979 | Ichiyanagi | 352/29 |

*Primary Examiner*—Russell E. Adams
*Attorney, Agent, or Firm*—Fitzpatrick, Cella, Harper & Scinto

[57] ABSTRACT

In a sound motion picture camera which permits both sound filming and silent filming by selective use of a sound film cartridge and a silent film cartridge, utilization is made of only signals from loop detecting means for detecting variations in the length of a loop of sound film formed between the exposure station and the sound recording station of the camera during the use of the sound film cartridge, whereby during the use of the silent film cartridge, the film transport speed of a first film transport means for effecting film transport at the exposure station is automatically set to a first speed suited for use of the silent film cartridge and during the use of the sound film cartridge, the film transport speed of the first film transport means is changed over between a second speed higher than the film transport speed of a second film transport means for effecting film transport at the sound recording station and a third speed lower than the film transport speed of the second film transport means in accordance with a decrease and an increase in the film loop length so that the film loop may be maintained at a predetermined length.

43 Claims, 34 Drawing Figures

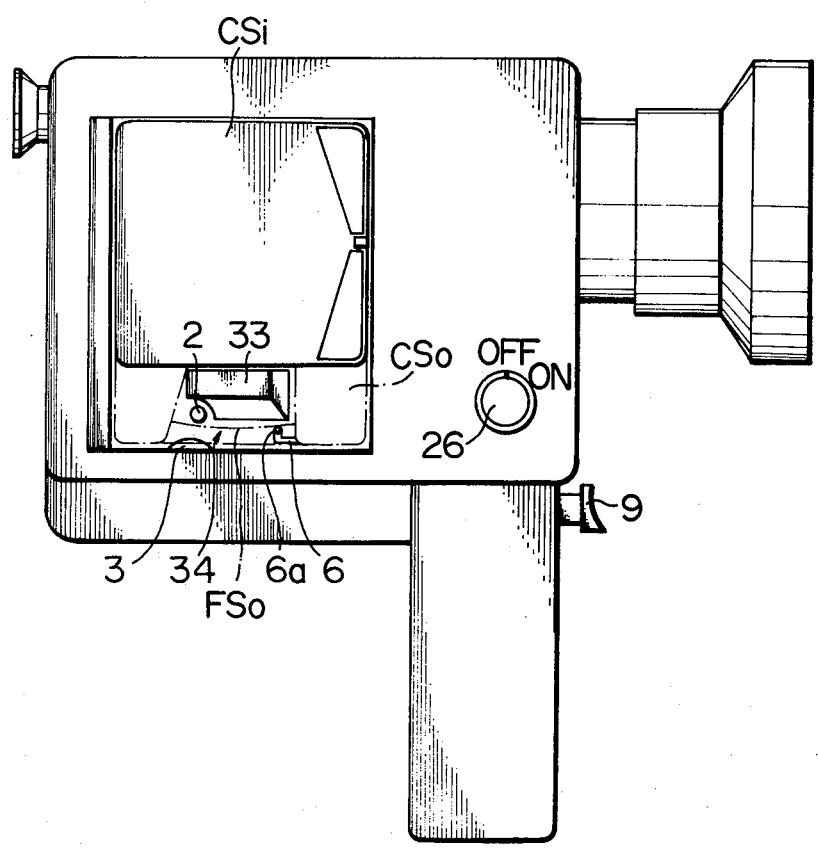

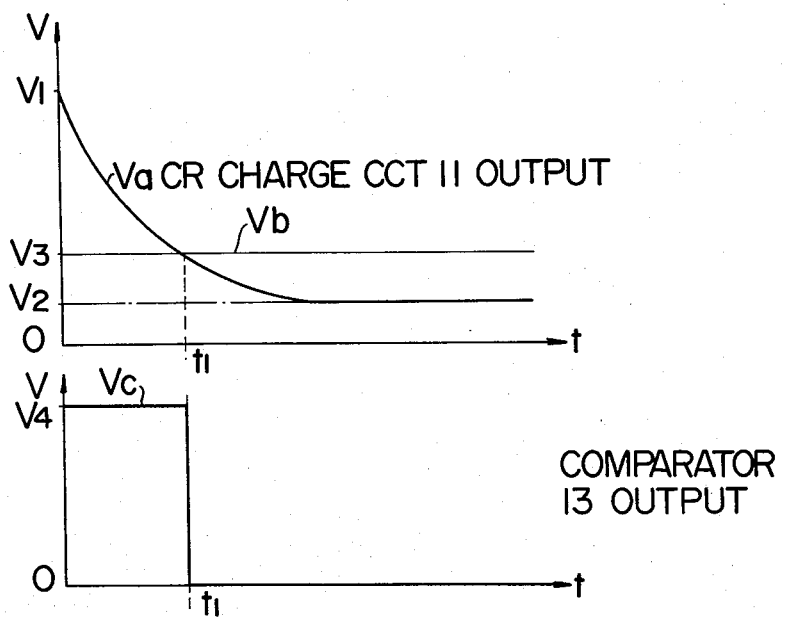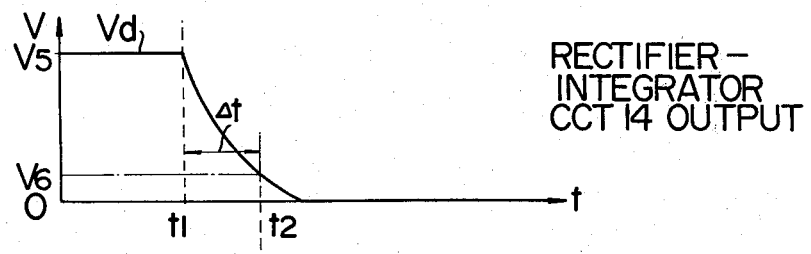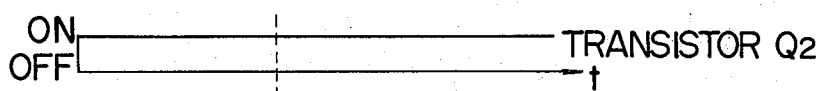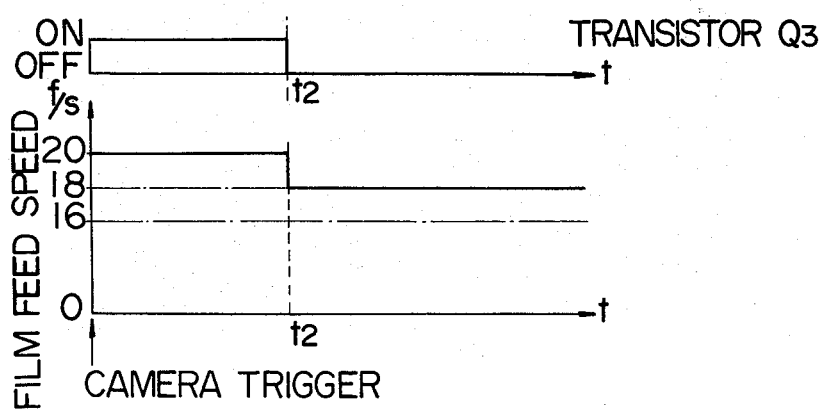

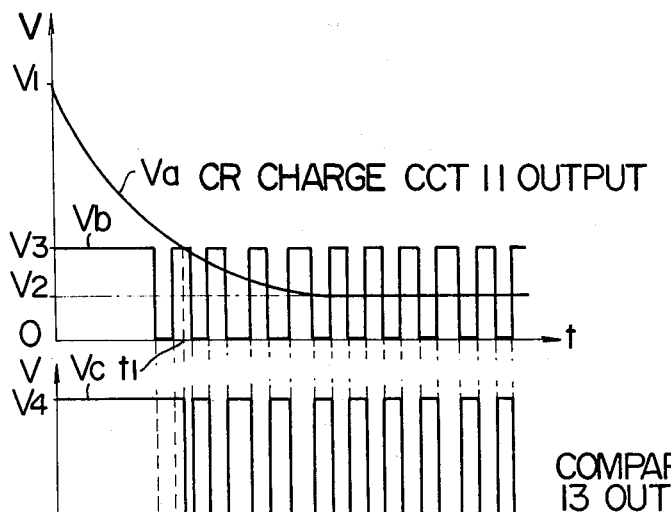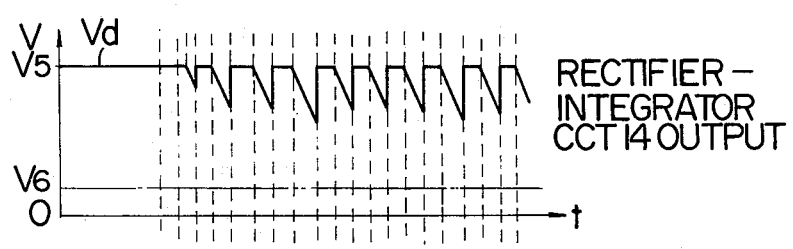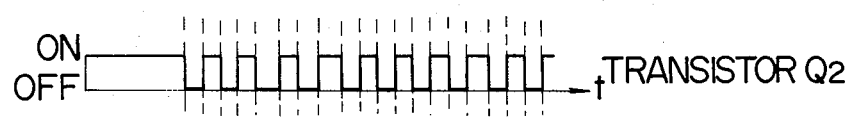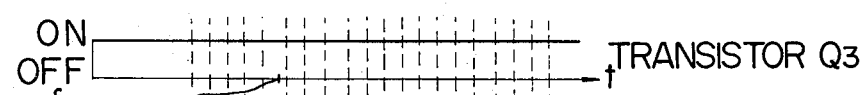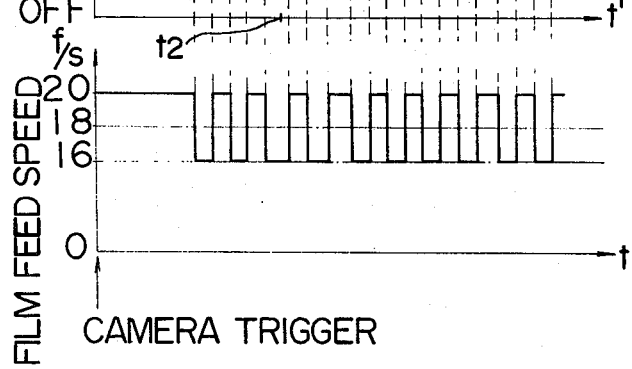

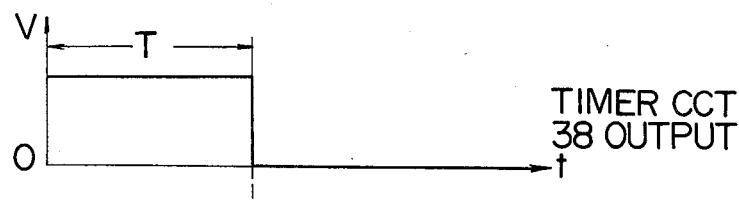
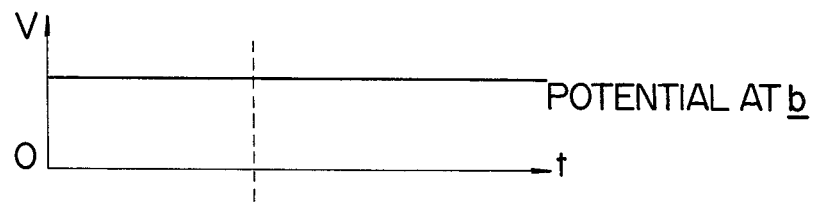
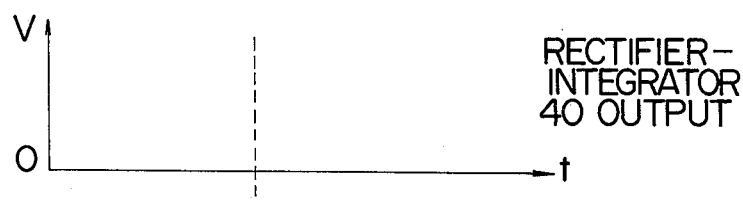
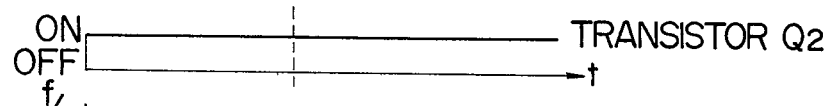
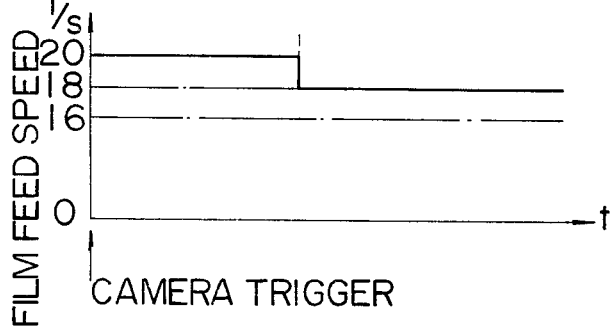

FIG.IOA 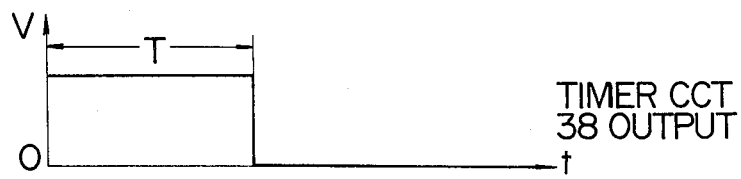
TIMER CCT 38 OUTPUT
FIG.IOB 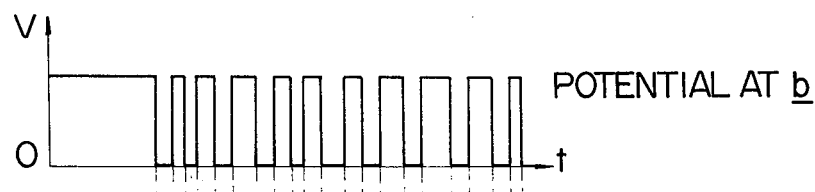
POTENTIAL AT b
FIG.IOC 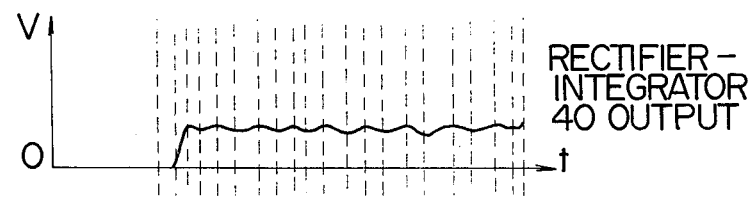
RECTIFIER-INTEGRATOR 40 OUTPUT
FIG.IOD 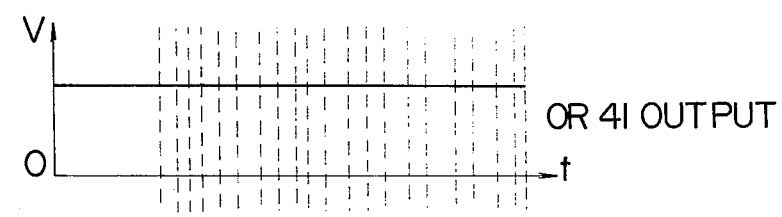
OR 41 OUTPUT
FIG.IOE 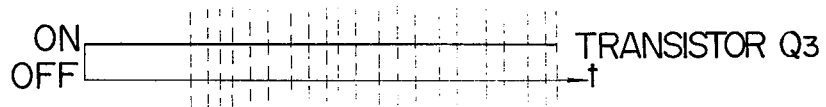
TRANSISTOR Q3
FIG.IOF 
TRANSISTOR Q2
FIG.IOG 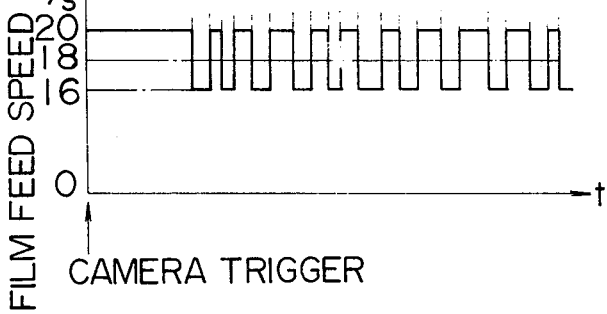
CAMERA TRIGGER

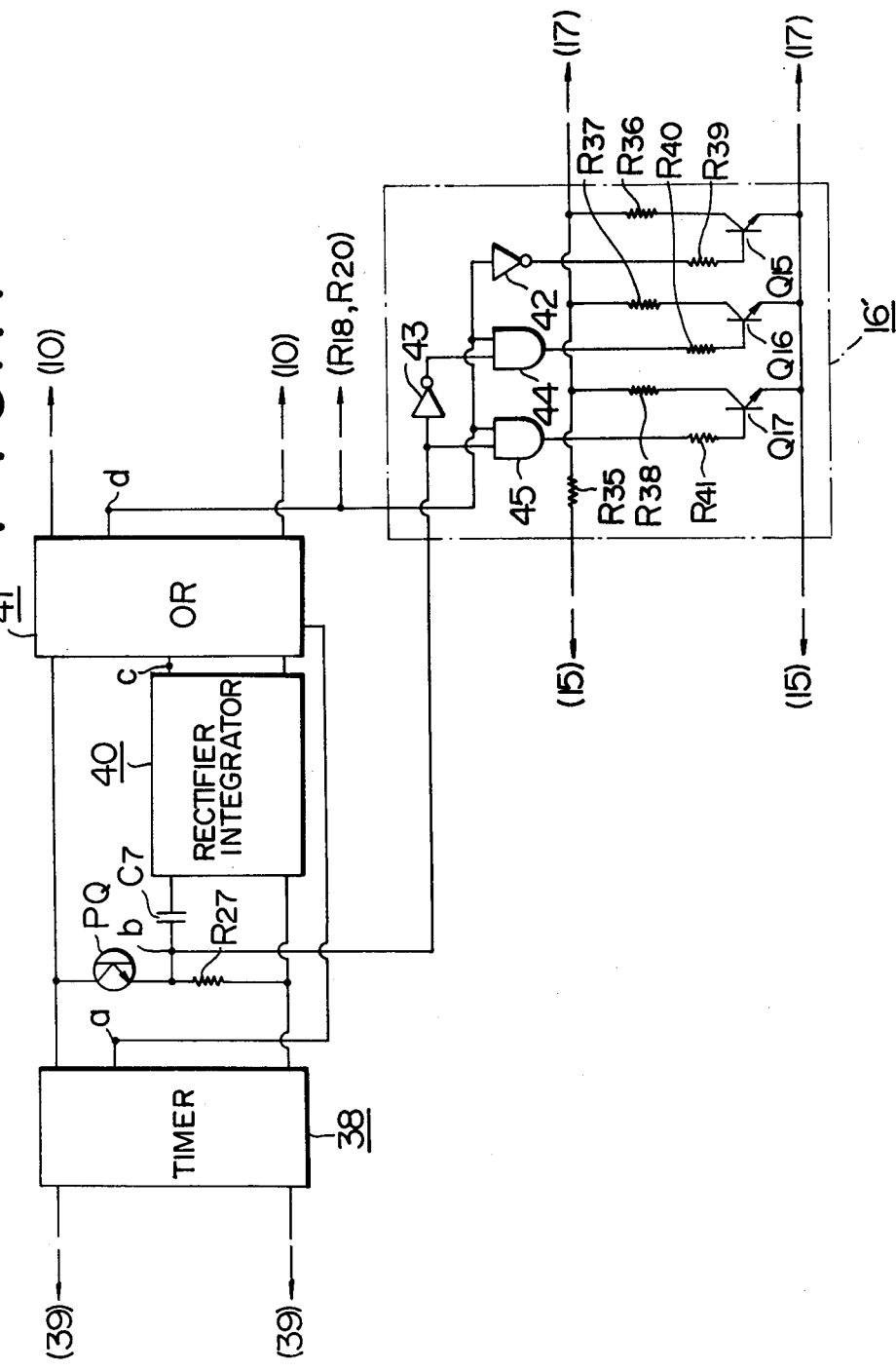

SOUND MOTION PICTURE CAMERA

This is a continuation, of application Ser. No. 961,766, filed Nov. 17, 1978, now abandoned.

BACKGROUND OF THE INVENTION

1. Field of the Invention

This invention relates to a sound motion picture camera which permits the sound filming by the use of a sound film cartridge and which further permits the silent filming by the use of a silent film cartridge.

2. Description of the Prior Art

The sound motion picture camera which permits selective use of a sound film cartridge and a silent film cartridge is entering its age of prosperity and usually, the sound motion picture camera of this type is provided with two motors for transporting the film.

One of the two motors is a film transport pawl driving motor which is used for the drive of the film transport pawl (first film transport means) for intermittently transporting the film at the exposure station of the camera, namely, at the region of the exposure aperture for filming. The other motor is a capstan driving motor which is used for the drive of a capstan (second film transport means) for continuously transporting the film at a constant speed at the sound recording station of the camera, namely, at the region of a recording magnetic head for the sound recording.

In the sound motion picture camera of this type, where sound filming is to be effected by the use of a sound film cartridge, a film loop is formed between the exposure station and the sound recording station so that the recording condition at the sound recording station may not be hindered by the pulsation of the film resulting from the intermittent transport of the film at the exposure station. Of course, in this case, the film loop must be always maintained at a predetermined length (usually, a loop length corresponding to the film length corresponding to 18 frames) in order to provide good synchronization between the image and the sound, but the film transport by the capstan at the sound recording station is apt to suffer from transport irregularity of the film due to slip between the capstan and the film and this may result in a variation in film loop length between the exposure station and the sound recording station. Accordingly, the general practice is to effect constant speed control of one of the two motors and effect variable speed control of the other motor to maintain a constant length of film loop. More particularly, for example, the constant speed control is effected on the capstan driving motor to provide a constant speed while a variable speed control is effected on the film transport pawl driving motor such that when the film loop is increased over a predetermined length, the speed of this motor is decreased to decrease the loop length by a signal from a loop detecting means for detecting any variation in the length of the film loop formed between the exposure station and the sound recording station and that when the film loop length is decreased below said predetermined length, the speed of the film transport pawl driving motor is increased to increase the film loop length.

In the sound motion picture camera of this type, the silent filming using a silent film cartridge is also possible and in silent filming, the capstan driving motor need not be operated, of course, and with regard to the film transport pawl driving motor, the variable speed control by the signal from loop detecting means as described above is not necessary but a constant speed control need only be effected so that a filming frame speed simply set may be obtained.

Thus, in the sound motion picture camera of this type, particularly as regards the film transport pawl driving motor, the mode of the speed control must be changed over to an entirely different mode from the sound filming using the sound film cartridge to the silent filming using the silent film cartridge and heretofore, as a method of automatically achieving this change-over, it has been usually practised, as proposed in U.S. Pat. No. 4,003,643 (issued on Jan. 18, 1977, granted to Treudenschuss et al. for the invention entitled "MOTION-PICTURE CAMERA ACCOMMODATING SILENT-FILM AND SOUND-FILM CASSETTES"), to install a mechanical cartridge type detecting means particularly at a position in the camera's cartridge loading chamber which enables discrimination of the difference in shape between the sound film cartridge and the silent film cartridge and to change over the speed control system for the film transport pawl driving motor from the constant speed control system to the variable speed control system by the film loop detecting means, in accordance with a mechanical signal from said detector means.

However, the provision of such means for mechanically detecting the difference in shape between the film cartridges has led to increased malfunctioning and could not avoid such fears as incomplete detection attributable to inappropriate loading of the film cartridge, or unsatisfactory mechanical contacts responsive to this detecting means, or malfunctioning attributable to non-contact.

On the other hand, as regards the change-over of the speed control of the film transport pawl driving motor, a method as proposed in U.S. patent Defensive Publication No. T920,009. (Published on Mar. 5, 1974, invented by Kosarko, title of the invention "CONTROL MEANS FOR A SOUND MOTION PICTURE CAMERA") has also been employed which comprises suitably effecting the constant speed control and the variable speed control of the film transport pawl driving motor in accordance with whether or not the loop detecting means has detected a variation in length of film loop, by simply utilizing only such film loop detecting means without resorting to the cartridge type detecting means as described above. More specifically, the method as proposed in this Defensive Publication No. T920,009 comprises controlling the film transport pawl driving motor to, for example, a rotational speed corresponding to the film transport speed of 20 frames/sec. of the film transport pawl when the film loop detecting means does not detect an increase in length of film loop over a predetermined length and controlling the film transport pawl driving motor to, for example, a rotational speed corresponding to the film transport speed of 16 frames/sec. of the film transport pawl to decrease the film loop length when the film loop detecting means detects an increase in length of film loop over the predetermined length. Therefore, in the sound motion picture camera employing such method, the film transport pawl driving motor is constantly controlled to a rotational speed corresponding to the filming speed of 20 frames/sec. during the silent filming using a silent film cartridge (because the film loop detecting means is not actuated at all), while during the sound filming using a sound film cartridge, the film transport pawl driving motor is variably controlled between two different rotational speeds corresponding to the filming speeds of 20 frames/sec. and 16 frames/sec. in accordance with the detection signal from the film loop detecting means (that is, controlled such that an average filming speed of 18 frames/sec. is obtained). This latter method entirely eliminates the cartridge type detecting means used in the method proposed in the aforementioned U.S. Pat. No. 4,003,643 and is advantageous in that it can avoid the above-noted inconveniences which result from the provision of the cartridge type detecting means. On the other hand, however, the latter method suffers from inconveniences as described below. In this method, where silent filming using a silent film cartridge is effected, the filming speed becomes 20 frames/sec. In conventional (sound or silent) motion picture projectors, the projection speed of 18 frames/sec. is standard and, if the silent film photographed by a sound motion picture camera employing the method as proposed in the Defensive Publication No. T920,009 is projected by the use of a conventional motion picture projector, the motion pictures reproduced will be ludicrous because of the difference between the filming speed and the projection speed.

SUMMARY OF THE INVENTION

The present invention has been made in view of the above-described situation and has for its primary object to provide a more improved and novel sound motion picture camera which permits selective use of a sound film cartridge and a silent film cartridge and which can accurately, reliably and automatically set the control style of the film transport speed of a film transport means (film transport pawl) effecting the film transport at the exposure station to the constant speed control and the variable speed control in accordance with each filming mode between the sound filming using the sound film cartridge and the silent filming using the silent film cartridge, without resorting to the mechanical cartridge type detecting means in the cartridge loading chamber as heretofore used.

For such an object, according to the present invention, there is proposed a novel form of the sound motion picture camera in which utilization is made of only signals from loop detecting means for detecting variations in a loop of sound film formed between the exposure station and the sound recording station of the camera during the use of a sound film cartridge, whereby during the use of a silent film cartridge, the film transport speed of a first film transport means for effecting film transport at the exposure station is automatically set to a first speed suited for the use of the silent film cartridge and during the use of the sound film cartridge, the film transport speed of the first film transport means is changed over between a second speed higher than the film transport speed of a second film transport means for effecting film transport at the sound recording station and a third speed lower than the film transport speed of the second film transport means in accordance with a decrease and an increase in the film loop length so that the film loop may be maintained at a predetermined length.

More particularly, according to a preferred embodiment of the present invention, there is proposed a construction of a sound motion picture camera which is provided with a signal output circuit adapted to put out a signal assuming a level above a predetermined level until lapse of at least a predetermined time after camera trigger and continues to put out a signal assuming a level above the predetermined level even after lapse of said predetermined time whenever the output of the loop detecting means is varied in accordance with a variation in the film loop length after camera trigger, and a film transport speed setting circuit adapted to receive both the output of the signal output circuit and the output of said loop detecting means to change over the film transport speed of the first film transport means between the second and the third speed in accordance with the variation in output of the loop detecting means when the output of the signal output circuit is at a level above the predetermined level and to set the film transport speed of the first film transport means to said first speed when the output of the signal output circuit is above said predetermined level and in which, if a variation corresponding to the variation in film loop length does not occur to the output of the loop detecting means after camera trigger, the film transport speed of the first film transport means is set to the first speed after lapse of the predetermined time and when a variation corresponding to a variation in film loop length occurs to the output of the loop detecting means after camera trigger, the film transport speed of the first film transport means is changed over between said second and third speeds in accordance with the variation in the output.

According to such characteristic construction of the present invention, the mechanical detecting means for detecting the difference in shape between film cartridges which has been usual with the sound motion picture camera of this type is entirely eliminated and all the fears such as the malfunctioning attributable to inappropriate loading of a film cartridge, or the malfunctioning attributable to unsatisfactory contact or non-contact of the mechanical contacts which would otherwise result from the provision of the mechanical detecting means can be avoided and the control style of the film transport speed at the exposure station can always be set accurately, reliably and automatically to the variable speed control and the constant speed control in accordance with the desired filming mode between the sound filming using a sound film cartridge and the silent filming using a silent film cartridge.

Incidentally, the now commercially available sound film cartridges are partly larger in size than silent film cartridges, as is well-known, namely, larger by the gate portion for the recording, and if the sound film cartridges become similar in shape and size to the silent film cartridges, the cartridge type detecting means used in the conventional sound motion picture cameras could not perform its function and the setting of appropriate control style of the film transport speed at the exposure station would become impossible, whereas the sound motion picture camera according to the present invention could well meet such a situation.

It is another object of the present invention to provide an improved and more advantageous form of the sound motion picture camera which can positively achieve the intended purposes of the present invention without complicating the mechanical construction in carrying out the present invention.

For such an object, according to an embodiment of the present invention, there is proposed a more advantageous form of the sound motion picture camera which employs a photoelectric film loop detecting device comprising a projector means for projecting a light which does not sensitize the film toward the sound film path between the exposure station and the sound recording station, and light receiving means disposed at such a position that the condition of incidence of the light projected from the projector means is varied in accordance with an increase or a decrease in the loop of sound film formed between the exposure station and the sound recording station during the use of the sound film cartridge, and in which the output signal of the light receiving means is utilized.

According to this, in addition to the above-noted advantages, the mechanical construction as the film loop detecting device becomes unnecessary to prevent complication of the mechanical construction of the camera and moreover, the fears such as the malfunctioning of the circuit system which would otherwise result from unsatisfactory contact or spike noise resulting from the adoption of a mechanical contact switch may be cleared away.

It is still another object of the present invention to enable the control of the operation and non-operation of the second film transport means for transporting the film at the sound recording station and the recording circuit to be automatically achieved in accordance with the set condition of the control style of the film transport speed of the first film transport means without resorting to the signal from the abovedescribed cartridge type detecting means.

For such an object, according to a preferred embodiment of the present invention, there is proposed a further advantageous form of the sound motion picture camera in which the control of operation and non-operation of the above-described second film transport means and the recording circuit may be effected in accordance with whether or not the output of said signal output circuit is above the predetermined level, and this is very useful in that the advantages similar to those mentioned at the outset may be obtained with regard also to the operation and non-operation of the second film transport means and the recording circuit.

Other objects and features of the present invention will become fully apparent from the following detailed description of the invention taken in conjunction with the accompanying drawings.

BRIEF DESCRIPTION OF THE DRAWINGS

FIG. 1 is a schematic view showing a first embodiment of the sound motion picture camera according to the present invention with the cartridge loading chamber cover removed therefrom;

FIGS. 4a–c and 5a–c show the potentials at points a, b, c and d in the circuit of FIG. 11. FIGS. 4d–e and 5d–e show the manner of switching of transistors Q2 and Q3 as well as the setting condition of the film transport speed at the filming station by the switching. FIG. 4f showing the condition during the silent filming using a silent film cartridge, and FIG. 5f showing the condition during the sound filming using a sound film cartridge;

FIGS. 9a–d and 10a–d show the potential at points a, b, c and d in the circuit system of FIG. 8. FIGS. 9e–f and 10e–f show the manner of switching of transistors Q2 and Q3 as well as the setting condition of the film transport speed at the filming station. FIG. 9g showing the condition during the use of a silent film cartridge, and FIG. 10g showing the condition during the use of a sound film cartridge; and FIG. 11 is a circuit connection diagram showing the construction of essential portions of the electric circuit system in a modification of the camera according to the second embodiment which differ from the second embodiment.

DESCRIPTION OF THE PREFERRED EMBODIMENTS

Reference is first had to FIGS. 1 to 5 to describe a first embodiment of the sound motion picture camera according to the present invention.

Figure 2A:
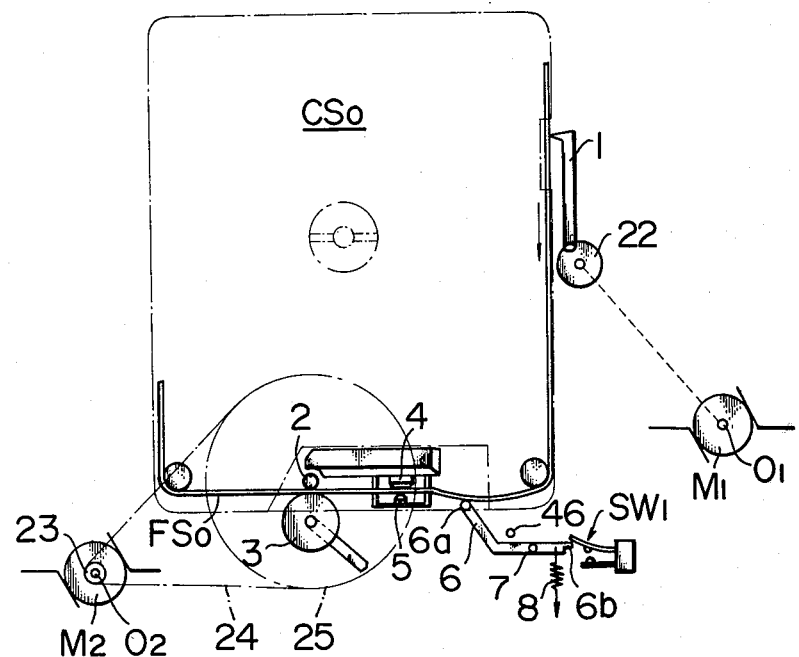
FIGS. 2A and 2B are schematic views showing the filming condition of the camera using different types of film cartridges, FIG. 2A showing the filming condition using a sound film cartridge and FIG. 2B showing the filming condition using a silent film cartridge.
Figure 2B:
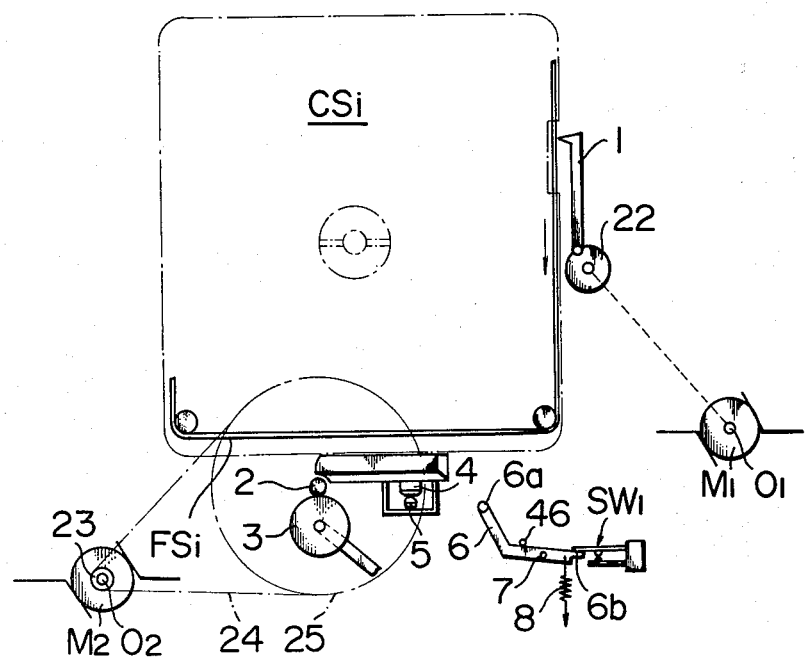

Referring first to FIGS. 1, 2A and 2B, it shows the mechanical construction of essential portions of the third embodiment which pertain to the present invention.

In these Figures, reference numeral 1 designates a film transport pawl as a first film transport means for intermittently transporting the film at the exposure station, namely, at the region of the exposure aperture. The film transport pawl 1 is driven from a film transport pawl driving motor M1 through a cam 22 mechanically connected to the output shaft $O_1$ of the motor M1. Designated by 2 is a capstan for continuously transporting a sound film FSo at the sound recording station, namely, at the region of the recording magnetic head during the sound filming using a sound film cartridge CSo. The capstan 2 is formed as the rotary shaft of a fly wheel 25 driven from a capstan driving motor M2 which is independent of the film transport pawl driving motor M1. The fly wheel 25 is driven through a rubber belt 24 stretched between the fly wheel and a pulley 23 mounted on the output shaft $O_2$ of the motor M2. Denoted by 3 is a pinch roller for urging the sound film FSo against the capstan 2 to continuously transport the film at the sound recording station. Designated by 4 is a recording magnetic head, and 5 a head pad for urging the sound film FSo against the magnetic head 4 for the recording. Reference numeral 6 designates a loop sensor for detecting a variation in amount of the film loop formed between the exposure aperture and the magnetic head 4 during the sound filming using the sound film cartridge CSo. The loop sensor 6 has a detecting portion 6a extending into a film cartridge loading chamber and engageable with the film in the loop portion, and is pivotally supported by a fixed shaft 7. Denoted by 8 is a spring for biasing the loop sensor 6 for clockwise rotation about the shaft 7, namely, for rotation following the decrease in loop length. Designated by 46 is a stop pin for the loop sensor 6.

SW1 is a normally closed loop detecting switch which is disposed at such a position that it is opened by the tail end 6b of the loop sensor 6 when the loop sensor 6 is rotated counter-clockwisely about the shaft 7 against the force of a spring 8 in response to an increase in film loop length.

In FIG. 1, reference numeral 9 denotes a camera trigger button, 26 a main switch operating dial and 33 a head holding member mounted to the wall of a cartridge loading chamber. The magnetic head 4 is mounted on the head holding member 33.

The above-described construction is entirely similar to that of the conventional sound motion picture camera.

Figure 3:
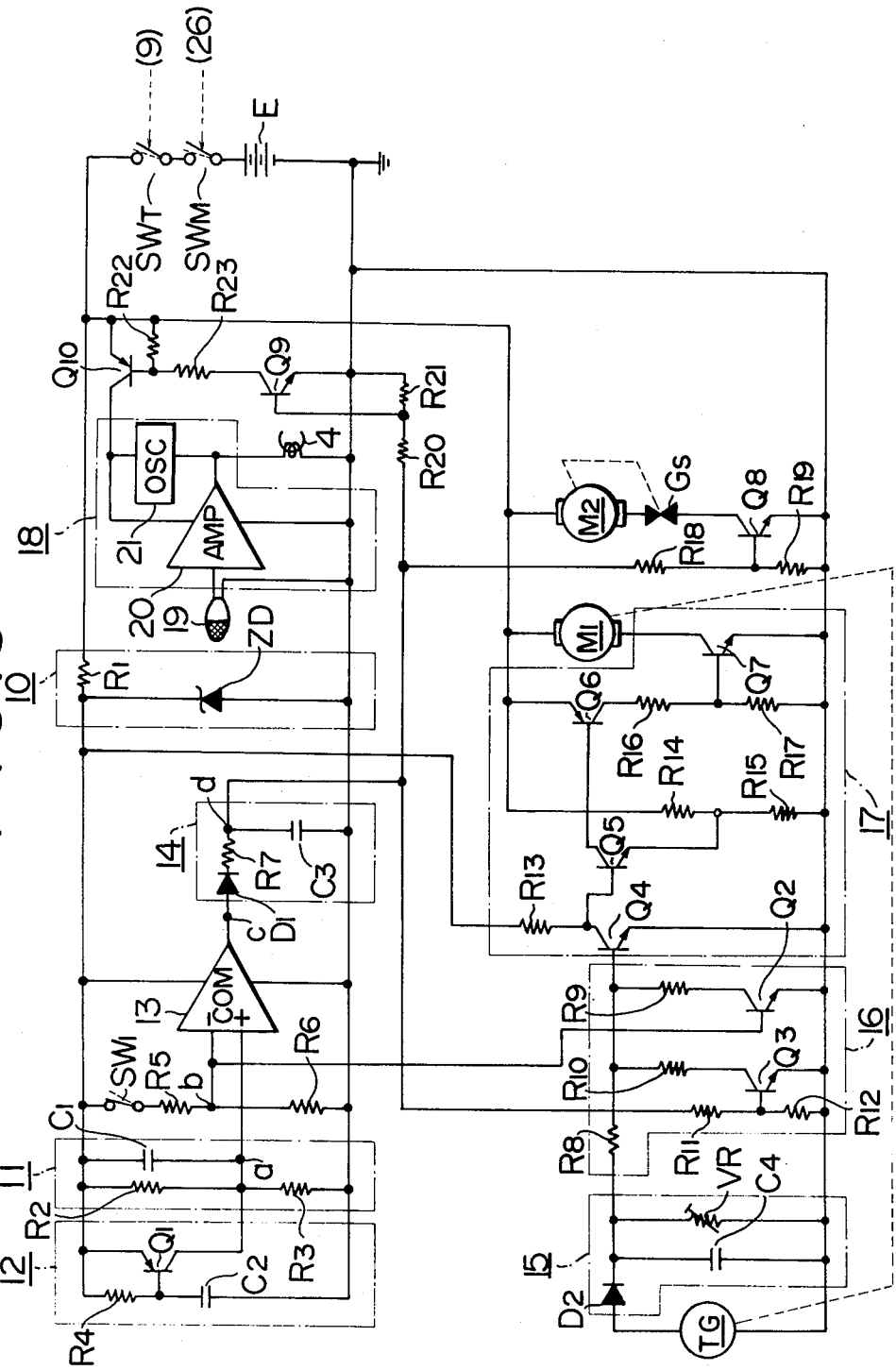
FIG. 3 is a circuit connection diagram showing a specific example of the construction of the electric circuit system in the camera.

Reference is now had to FIG. 3 to describe the construction of the electric circuit system in the camera according to this first embodiment.

In the shown electric circuit, E is a power supply battery as the power source for the camera, $SW_M$ is a main switch adapted to be closed upon operation of the operating dial 26, $SW_T$ is a trigger switch closed during camera trigger upon operation of the camera trigger button 9, 10 denotes a constant voltage circuit comprising a constant voltage diode ZD and a resistor R1, and 11 designates a CR charging circuit comprising voltage dividing resistors R2, R3 and a capacitor C1. Designated by 12 is an initial discharging circuit for discharging the capacitor C1 in the CR charging circuit 11 immediately after the trigger switch $SW_T$ is closed. The initial discharging circuit 12 comprises a capacitor C2, a resistor R4 connected to the capacitor C2 and a pnp transistor Q1 whose base is connected to the resistor R4 and the capacitor C2. The emitter and collector of the transistor Q1 are connected to the capacitor C1 in the CR charging circuit 11. R5 and R6 are resistors forming a voltage dividing circuit and the aforementioned loop detecting switch SW1 is connected to the constant voltage circuit 10 with the resistors R5 and R6. Denoted by 13 is a comparator whose inversion input receives the output at the voltage dividing point b between the voltage dividing resistors R5 and R6 and whose non-inversion input receives the voltage at the junction between the resistors R2, R3 and the capacitor C1 in the CR charging circuit 11. Denoted by 14 is a rectifying-integrating circuit for rectifying and integrating the output of the comparator 13. The rectifying-integrating circuit comprises a diode D1, a resistor R7 and a capacitor C3.

TG is a tachogenerator mechanically connected to the output shaft $O_1$ of the film transport pawl driving motor M1 and generating a voltage corresponding to the rotational speed of the motor M1. Reference numeral 15 designates a rectifier circuit for rectifying the output of the tachogenerator TG and it comprises a diode D2, a capacitor C4 and a variable resistor VR for regulating the output. Denoted by 16 is a speed setting circuit for setting the rotational speed of the film transport pawl driving motor M1. The speed setting circuit 16 comprises a speed setting resistor R7 for controlling, with a speed setting resistor R8, the rotational speed of the motor M1 to a level which provides a film transport speed of 18 frames/sec. of the film transport pawl 1, a speed setting resistor R10 for controlling the rotational speed of the motor M1 to a level which provides a film transport speed of 16 frames/sec., an npn transistor Q2 for controlling the connection of the resistor R9 to the resistor R8, and an npn transistor Q3 for controlling the connection of the resistor R10 to the resistor R8. The base of the transistor Q2 is connected to the voltage dividing point b between the resistors R5 and R6 connected to the loop detecting switch SW1, and the base of the transistor Q3 is connected to the voltage dividing point between the series resistors R11 and R12 connected to the output terminal d of the rectifying-integrating circuit 14.

The combined resistance value of the speed setting resistors R9 and R10 is set with respect to the resistor R8 such that the rotational speed of the motor M1 may be controlled to a level corresponding to the film transport speed of 20 frames/sec. of the film transport pawl 1. Designated by 17 is a power supply control circuit for controlling the power supply to the motor M1 so that the rotational speed set by the speed setting circuit 16 may be obtained. The power supply control circuit 17 comprises an npn transistor Q4 whose base is connected to the junction between the resistors R8 and R9 in the speed setting circuit 16, an npn transistor Q5 whose base is connected to the collector side of the transistor Q4 and whose emitter is connected to the voltage dividing point between the series resistors R14 and R15, a pnp transistor Q6 whose base is connected to the collector side of the transistor Q5, and an npn transistor Q7 whose base is connected to the voltage dividing point between the series resistors R16 and R17 connected to the collector side of the transistor Q6. The motor M1 is connected to the collector side of the last stage transistor Q7. Designated by R13 is a protective resistor for the transistors Q4 and Q5, and the collector of the transistor Q4 and the base of the transistor Q5 are connected to the constant voltage circuit 10 through the resistor R13.

Accordingly, when the base potential of the transistor Q4 reaches the conduction level of the transistor Q4 (for example, 0.6 V), the transistor Q4 is turned on to thereby turn off the transistors Q5–Q7 and cut off the power supply to the motor M1. Here, the resistance values of the speed setting resistors R8, R9 and R10 in the speed setting circuit 16 are set in a manner described below. That is, they are set such that when only the resistor R9 is selected with respect to the resistor R8, and when the rotational speed of the motor M1 exceeds the level corresponding to the film transport speed of 18 frames/sec. of the film transport pawl, the potential at the voltage dividing point between these resistors R8 and R9 reaches the conduction level of the transistor Q4 with respect to the then output voltage of the rectifier circuit 15, that when only the resistor R10 is selected with respect to the resistor R8 and when the rotational speed of the motor M1 exceeds the level corresponding to the film transport speed of 16 frames/sec. of the film transport pawl, the potential at the voltage dividing point between these resistors R8 and R10 reaches the conduction level of the transistor Q4 with respect to the then output voltage of the rectifier circuit 15, and that when both of the resistors R7 and R10 are selected with respect to the resistor R8 and when the rotational speed of the motor M1 exceeds the level corresponding to the film transport speed of 20 frames/sec. of the film transport pawl, the potential at the voltage dividing point between the resistors R8, R9 and R10 reaches the conduction level of the transistor Q4 with respect to the output voltage of the rectifier circuit 15.

In the power supply control circuit 17, the shown connection of the transistor Q5 and the resistors R14, R15 is contrived such that for a variation in base current of the transistors Q6 and Q7 resulting from a voltage fluctuation, the emitter voltage of the transistor Q5 is varied to thereby ensure the rotational speed of the motor M1 to be the rotational speed set by the speed setting circuit for any voltage fluctuation.

What has been described above constitutes the speed control system for the film transport pawl driving motor M1. GS is a mechanical governor switch for controlling the rotational speed of the capstan driving motor M2 to the level corresponding to the film transport speed of 18 frame/sec. of the capstan 2. The governor switch GS is connected to the output shaft $O_2$ of the motor M2. Designated by Q8 is an npn transistor for controlling the operation and non-operation of the motor M2. The base of the transistor Q8 is connected to the voltage dividing point between series resistors R18 and R19 connected to the output terminal d of the rectifying-integrating circuit 14.

A recording circuit 18 comprises an audio amplifier 20 for amplifying the audio signals from a microphone 19 and a bias oscillator 21. The magnetic head 4 is connected to the output terminal of the recording circuit 18. Designated by Q9 and Q10 are npn and pnp transistors for controlling the power supply to the recording circuit 18. The base of the transistor Q9 is connected to the voltage dividing point between series resistors R20 and R21 connected to the output terminal d of the rectifying-integrating circuit 14, and the base of the transistor Q10 is connected to the voltage dividing point between series resistors R22 and R23 connected to the collector side of the transistor Q9.

Accordingly, the capstan driving motor M2 and the recording circuit 18 become operative only when the output of the rectifying-integrating circuit 14 is at high level.

Reference is now had to FIGS. 4 and 5 to describe the operation of the above-described sound motion picture camera during the filming.

Now, in the above-described construction, when the trigger switch $SW_T$ is closed to effect photography with the silent film cartridge $CS_i$ or the sound film cartridge $CS_o$ loaded into the cartridge loading chamber and with the main switch $SW_M$ closed, the transistor Q1 in the initial discharging circuit 12 conducts so that there is formed a discharging path for the capacitor C1 in the CR charging circuit 11 and at this time, the potential Va at the point a substantially assumes the output potential $V_1$ of the constant voltage circuit 10 but, as the capacitor C2 in the discharging circuit 12 is gradually charged, the transistor Q1 gradually becomes turned off, so that the capacitor C1 in the charging circuit 11 is gradually charged and accordingly, the potential Va at the point a is gradually decreased down to $V_2 = R_{53}/(R_{52}+R_{53}) \cdot V_1$ at a point of time whereat the capacitor C1 has been fully charged (see FIGS. 4A and 5A). The potential Va at this point a is applied to the non-inversion input of the comparator 13 and compared therein with the potential Vb at the voltage dividing point b between the resistors R5 and R6 applied to the inversion input of the comparator 13 (this potential Vb is varied between the voltage dividing level $V_3$ by the resistors R5 and R6 and zero level in accordance with the ON-OFF of the loop detecting switch SW1—see FIG. 5A), and as the result, an output Vc occurs at the output terminal c of the comparator 13, the output Vc maintaining a level $V_4$ as long as Va>Vb and being decreased to zero level when Va≦Vb (see FIGS. 4B and 5B). The output Vc of the comparator 13 is rectified and integrated by the next rectifying-integrating circuit 14 and occurs at the output terminal d as the output Vd assuming the level $V_5$ with respect to the level $V_4$ at the output Vc of the comparator 13 (see FIGS. 4C and 5C).

$V_6$ is the voltage level at which the transistors Q3, Q8 and Q9 conduct.

Now, what speed setting resistor is selected in the speed setting circuit 16 depends on whether or not the loop detecting switch SW1 is switched after the camera trigger.

Let $t_1$ be the time required for the potential Va at the point a to reach a level $V_3$ from a level $V_1$ ($V_3$ is the potential at the voltage dividing point b when the switch SW1 is in ON position). Then, within the range of this time $t_1$, Va>Vb and therefore, the output Vd of the comparator 13 maintains a level $V_4$ at least during such time. While the silent film cartridge $CS_i$ is used as the film cartridge (see FIG. 2B), the detecting switch SW1 is always in ON position and therefore, if the time $t_1$ elapses, Va<Vd and the output Vc of the comparator 13 is immediately changed over from the level $V_4$ to the zero level (see FIGS. 4A and 4B), whereby the output Vd of the rectifying-integrating circuit 14 becomes gradually decreased at the point of time $t_1$ from the level $V_5$ in accordance with the time constant determined by the load to the rectifying-integrating circuit 14. If $\Delta t$ is the time required for the output Vd to reach a level $V_6$ from the level $V_5$, the transistor Q3 is cut off with a delay $\Delta t$ from the time $t_1$, namely, after the lapse of time $t_2$, ($=t_1+\Delta t$) from the camera trigger (see FIGS. 4C and 4E). Accordingly, both the transistors Q2 and Q3 conduct until the time $t_2$ elapses (see FIGS. 4D and 4E) and therefore, the resistors R9 and R10 are both selected with respect to the resistor R8, whereby the transistor Q4 in the power supply control circuit 17 conducts when the rotational speed of the film transport pawl driving motor M1 exceeds the level corresponding to the film transport speed of 20 frames/sec. and the transistor Q4 is cut off whenever the rotational speed of the motor M1 is lower than said level, and after all, when the rotational speed corresponding to the film transport speed of 20 frames/sec. is exceeded, the transistor Q4 is turned on to cut off the transistors Q5–Q7 and cut off the power supply, and the power supply is continued only when the rotational speed is less than said level, so that the rotational speed is controlled to the level corresponding to the film transport speed of 20 frames/sec. However, when the time $t_2$ elapses, the transistor Q3 is cut off, so that only the resistor R9 is selected with respect to the resistor R8, whereby the transistor Q4 conducts when the rotational speed of the motor M1 exceeds the level corresponding to the film transport speed of 18 frames/sec. and the transistor Q4 is cut off when the rotational speed is less than said level and after all, when the rotational speed corresponding to the film transport speed of 18 frames/sec. is exceeded, the transistor Q4 conducts to cut off the transistors Q5–Q7 and cut off the power supply to the film transport pawl driving motor M1 and the power supply is continued only when the rotational speed is less than said level, so that the rotational speed of the motor M1 is controlled to the level corresponding to the film transport speed of 18 frames/sec.

Thus, when the silent film cartridge $CS_i$ is used, the film transport speed at the exposure station is 20 frames/sec. until a predetermined time $t_2$ elapses after the camera trigger and in the meantime, the transistors Q8–Q10 are turned on by the output of the rectifying-integrating circuit 14, so that the capstan driving motor M2 and the recording circuit 18 are operated but, when the time $t_2$ elapses, the film transport speed at the exposure station becomes a constant speed of 18 frames/sec.

which is suited for use of the silent film cartridge CS$_i$ and at this point of time, the transistors Q8–Q10 are turned off to render inoperative the capstan driving motor M2 and the recording circuit 18 and after all, the camera comes to execute the filming operation in the silent filming mode.

In contrast, if the sound film cartridge CS$_o$ is used as the film cartridge (see FIG. 2A), the ON-OFF of the loop detecting switch SW1 repetitively takes place as the result of the intermittent transport of the sound film FS$_o$ effected by the film transport pawl 1 at the exposure station, whereby the potential at the voltage dividing point b is repetitively varied between the level V$_3$ and the zero level and accordingly, after the lapse of the time t$_1$, Va<Vb and Va>Vb take place alternately as the result of ON-OFF of the detecting switch SW1 (see FIG. 5A) and thus, after the lapse of the time t$_1$, the output Vc of the comparator 13 repeats variation between the zero level and the level V$_4$ (see FIG. 5B). The output Vd of the rectifying-integrating circuit 14 which receives the output Vc of the comparator 13 maintains level V$_5$ as long as the output Vc of the comparator 13 is a the level V$_4$, and the output Vd is gradually decreased in accordance with the time constant when the output Vc of the comparator 13 becomes zero level. Accordingly, as will be understood from FIG. 5B, by selecting the time constant such that the output Vd of the rectifying-integrating circuit 14 does not reach the level V$_6$ during the time from when the output Vc of the comparator 13 is decreased to zero level by the closing of the switch SW1 until the output Vc is again increased to the level V$_4$ by the opening of the switch SW1, the transistor Q3 in the speed setting circuit 16 maintains its conductive state by the ON-OFF of the detecting switch SW1 even after the lapse of the time t$_2$ (see FIG. 5E) while, on the other hand, the transistor Q2 repeats its ON-OFF in response to the ON-OFF of the detecting switch SW1 (see FIG. 5D). When the transistors Q2 and Q3 are both in conductive state, both of the resistors R9 and R10 are selected with respect to the resistor R8, so that the rotational speed of the motor M1 is controlled to the level corresponding to the film transport speed of 20 frames/sec. and on the other hand, when the transistor Q2 is cut off with the transistor Q3 turned on, only the resistor R10 is selected with respect to the resistor R8 and the transistor Q4 in the power supply control circuit 17 conducts when the rotational speed of the motor M1 exceeds the level corresponding to the film transport speed of 16 frames/sec. and the transistor Q4 is cut off when the rotational speed of the motor M1 is lower than said level, and therefore the rotational speed of the motor M1 is controlled to the level corresponding to the film transport speed of 16 frames/sec. and after all, the controlled rotational speed of the motor M1 is changed over between two levels corresponding to the film transport speeds of 16 frames/sec. and 20 frames/sec. in response to ON-OFF of the loop detecting switch SW1. That is, when the loop detecting switch SW1 is opened by increased film loop length, the transistor Q2 is turned off to break the connection of the resistor R9 and the resistor R10 alone is connected to the resistor R8, so that the rotational speed of the motor M1 is controlled to the level corresponding to the film transport speed of 16 frames/sec. to decrease the film loop length. On the other hand, when the loop detecting switch SW1 is turned on by a decrease in film loop length, the transistor Q2 is turned on and the resistor R9 is connected to the resistor R8 with the resistor R10, so that the rotational speed of the motor M1 is controlled to the level corresponding to the film transport speed of 20 frames/sec. to increase the film loop length.

Thus, during the use of the sound film cartridge CS$_o$, the film transport speed at the exposure station is changed over between 16 frames/sec. and 20 frames/sec. in accordance with the increase or decrease of the film loop length and the transistors Q8–Q10 are held in their ON state by the then output of the rectifying-integrating circuit 14 so that the capstan driving motor M2 and the recording circuit 18 are continuedly held in operative condition even after the lapse of the time t$_2$ and after all, the camera executes the filming in the sound filming mode (see FIG. 5F). In this case, the rotational speed of the capstan driving motor M2 is controlled to the level corresponding to the film transport speed of 18 frames/sec. by the governor switch GS.

In the first embodiment of the present invention, the silent filming using the silent film cartridge CS$_i$ and the sound filming using the sound film cartridge CS$_o$ are performed in the manner described above.

Reference is now had to FIGS. 6 to 10 to describe a second embodiment of the present invention. This second embodiment employs, instead of the mechanical film loop detecting device in the third embodiment, a photoelectric film loop detecting device comprising a projector for projecting light which does not sensitize the film and a light receptor responsive to the projected light from the projector.

Figure 6:
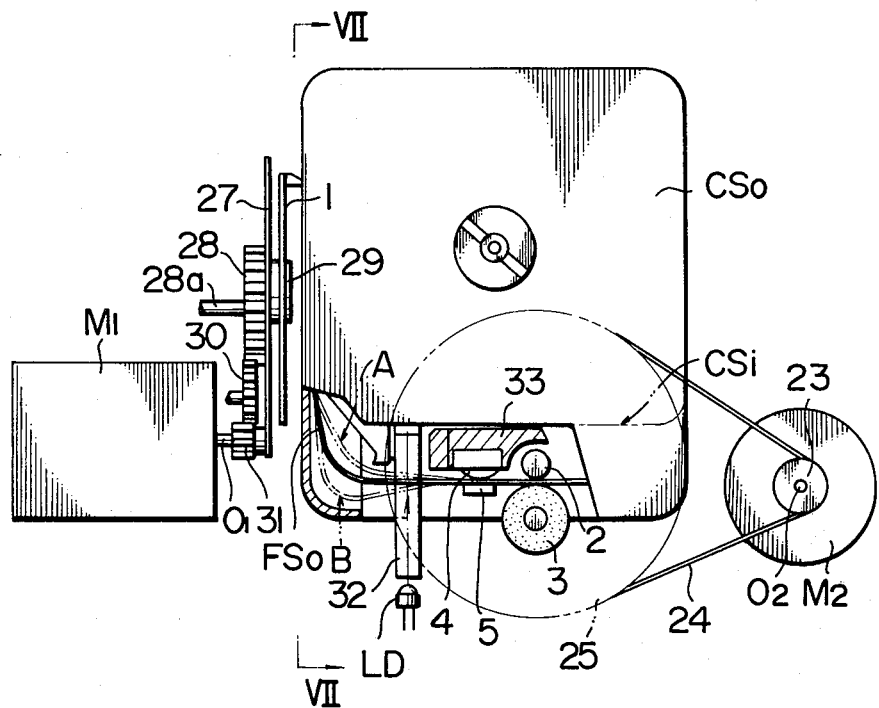
FIG. 6 shows the arrangement and construction of essential portions of a second embodiment of the sound motion picture camera according to the present invention which particularly pertain to the present invention.
Figure 7:
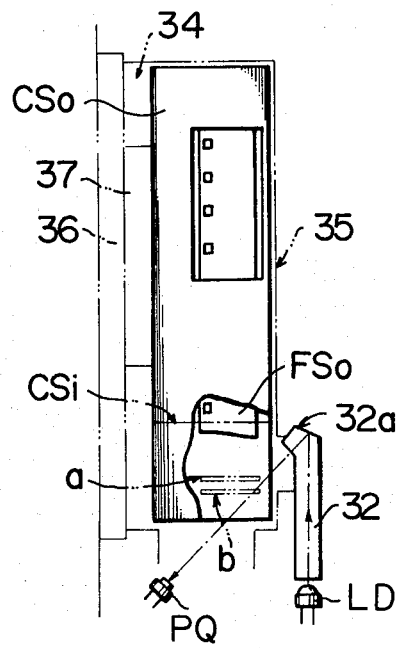
FIG. 7 is a partly broken away view taken along line VII—VII in FIG. 6.

Referring first to FIGS. 6 and 7, there is shown the arrangement and construction of essential portions of the second embodiment which pertain to the present invention. In FIGS. 6 and 7, the components given reference characters similar to those in FIGS. 1, 2A and 2B have the same constructions and functions as those in the first embodiment and therefore, the constructions which differ from the first embodiment will be chiefly described and the other points will be explained only to such an extent which will not hinder the understanding of the present embodiment.

In FIGS. 6 and 7, reference numeral 27 designates a shutter blade which is rotated to open and close the exposure aperture by a gear 28 integral therewith being driven from an output gear 31 mounted on the output shaft O$_1$ of the film transport pawl driving motor M1 through an intermediate gear 30. On the other hand, a film transport pawl 1 is made to slide up and down upon rotation of the shutter blade 27 by an eccentric cam 29 eccentrically mounted on the shutter blade 27 with respect to the rotary shaft 28a of the shutter blade 27, to thereby intermittently transport the film at the region of the exposure aperture.

LD designates a light-emitting diode as the projector forming a photoelectric film loop detecting device and it projects a relatively thin, parallel beam of light such as infrared light which does not sensitize the film. Designated by 32 is a light guide having a totally reflecting surface 32a (see FIG. 16) formed on top thereof at a predetermined angle of inclination for reflecting the light beam from the light-emitting diode LD toward the sound film path between the exposure station and the sound recording station. The light beam from the light-emitting diode LD is reflected toward the sound film path by the totally reflecting surface 32a of the light guide 32. PQ (see FIG. 7) is a phototransistor as a light receptor forming the photoelectric film loop detecting device with the light-emitting diode LD. The phototransistor PQ has a responsive light wave-length characteristic responsive to the light emitted from the light-emitting diode LD and is disposed so as to be capable of receiving the reflected light beam from the totally reflecting surface 32a of the light guide 32 with the sound film path intervening therebetween. More particularly, the phototransistor PQ is positioned such that during the sound filming using the sound film cartridge $CS_o$, when the loop length of the sound film $FS_o$ formed between the exposure station and the sound recording station, namely, between the exposure aperture and the magnetic head 4, is decreased as indicated by A in FIG. 6 and the film $FS_o$ in the sound film path near the projected position of the light beam from the totally reflecting surface 32a of the light guide 32 assumes the position as indicated by a in FIG. 7, the reflected light beam from the total reflecting surface 23a of the light guide 32 impinges on the phototransistor PQ to turn on the same and that when the film loop is increased as indicated by B in FIG. 6 and the film $FS_o$ in the sound film path near the projected position of the light beam from the totally reflecting surface 32a of the light guide assumes the position as indicated by b in FIG. 7, the reflected light beam from the totally reflecting surface 32a of the light guide 32 is intercepted by the film $FS_o$ to turn off the phototransistor PQ.

In FIG. 7, reference numeral 36 designates a cover for a cartridge loading chamber 34, reference numeral 37 denotes a cartridge urging member such as sponge rubber or the like attached to the back side of the cover 36, and reference numeral 35 designates a wall forming the loading chamber 34. The head holding member 33 is mounted on the loading chamber wall 35.

In the other points, the construction of the second embodiment is entirely the same as that of the first embodiment.

Figure 8:
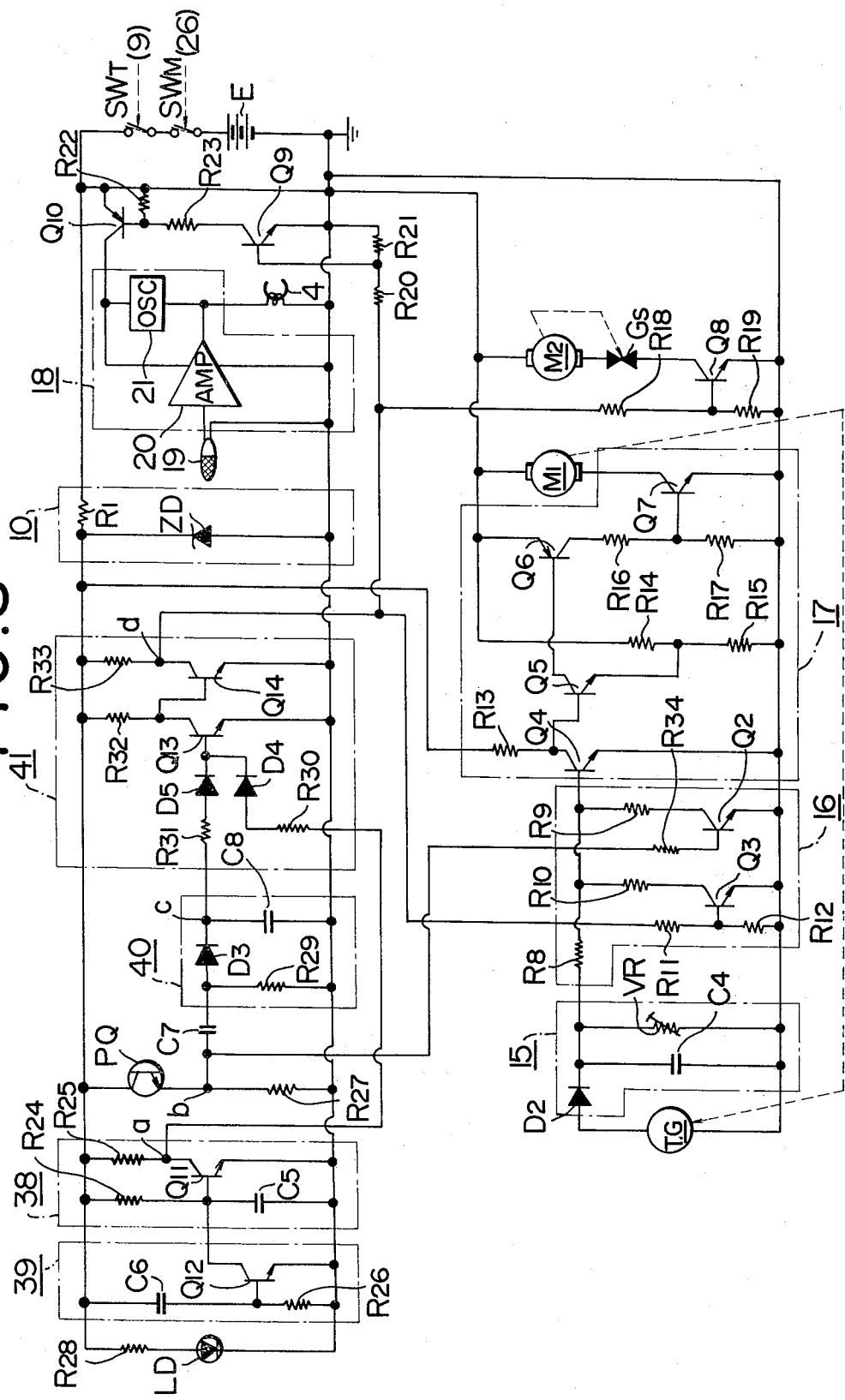
FIG. 8 is a circuit connection diagram showing the construction of the electric circuit system in the camera of the second embodiment.

Reference is now had to FIG. 8 to describe the construction of the electric circuit system in the camera of the fourth embodiment.

In the connection and arrangements of the electric circuit system shown in FIG. 8, the circuit blocks and circuit elements given reference characters similar to those in the circuit system of FIG. 3 have entirely the same constructions and functions those in the third embodiment and therefore, the construction which differ from the third embodiment will be chiefly described and the other points will be explained only to such an extent which will not hinder the understanding of the present embodiment.

In FIG. 8, reference numeral 38 designates a timer circuit for putting out a high level signal (see FIGS. 9A and 10A) for a predetermined time after closing of the trigger switch $SW_T$. The timer circuit 38 comprises a time constant capacitor C5, a resistor R24 connected to the capacitor C5, and an npn transistor Q11 whose base is connected to the junction between the capacitor C5 and the resistor R24. Designated by R25 is a protective resistor for the transistor Q11. The protective resistor R25 is connected to the collector side of the transistor Q11 and the aforementioned high level signal is obtained at the collector side of the transistor Q11. Denoted by 39 is an initial discharging circuit for discharging the capacitor C5 in the timer circuit 38 immediately after the closing of the trigger switch $SW_T$. The initial discharging circuit 39 comprises a capacitor C6, a resistor R26 connected to the capacitor C6 and an npn transistor Q12 whose base is connected to the junction between the capacitor C6 and the resistor R26. The collector side of the transistor Q12 is connected to the capacitor C5 in the timer circuit 38.

Here, the phototransistor PQ is connected to the constant voltage circuit 10 with the resistor R27, and the light-emitting diode LD is also connected to the constant voltage circuit 10 with the protective resistor R28.

C7 is a DC blocking capacitor connected to the junction c between the phototransistor PQ and the resistor R27. Designated by 40 is a rectifying-integrating circuit for rectifying and integrating the output of the capacitor C7, and it comprises a voltage clamping resistor R29, a rectifying diode D3 and an integrating capacitor C8. Denoted by 41 is an OR circuit for receiving both the output of the timer circuit 38 and the output of the rectifying-integrating circuit 40 (FIGS. 9C and 10C) and for putting out a high level signal (FIGS. 9D and 10D) as long as one of the outpts of the circuits 38 and 40 is above a predetermined level. The OR circuit 41 comprises an npn transistor Q13 whose base is connected through an anti-reverse current diode D4 and a resistor R30 to the output terminal a of the timer circuit 38, namely, the collector side of the transistor Q11 and connected through an anti-reverse current diode D5 and a resistor R31 to the output terminal c of the rectifying-integrating circuit 40, namely, the capacitor C8, and an npn transistor Q14 whose base is connected to the collector side of the transistor Q13. R32 and R33 are protective resistors for the transistors Q13 and Q14, respectively, and are connected to the collector sides of these transistors. The aforementioned high level signal is obtained at the collector side of the transistor Q34.

Here, the transistor Q2 in the speed setting circuit 16 has its base connected to the junction b between the phototransistor PQ and the resistor R27 through a protective resistor R34, and the series resistors R11 and R12 on the base side of the transistor Q3 are connected to the output terminal d of the OR circuit 41 with the series resistors R18 and R19 on the base side of the power supply control transistor Q8 for the capstan driving motor M2 and the series resistors R20 and R21 on the base side of the power supply control transistor Q9 for the recording circuit 18.

In the other points, the connection and arrangement of the circuit system in the present embodiment are entirely the same as those of the circuit system of FIG. 3.

Reference is now had to FIGS. 9 and 10 to describe the operation of the sound motion picture camera having the above-described construction.

Now, in the above-described construction, when the trigger switch $SW_T$ is closed by operating the trigger button 9 with the main switch $SW_M$ closed after a silent film cartridge $CS_i$ (the bottom of which is indicated by phantom line in FIGS. 6 and 7) or a sound film cartridge $CS_o$ is loaded into the cartridge loading chamber 34 to effect filming (at this time, the pinch roller 3 and the head pad 5 are urged against the film), power is supplied to the entire circuit shown in FIG. 8. Upon closing of the trigger switch $SW_T$, the transistor Q12 in the initial discharging circuit 39 is turned on for a moment until the capacitor C6 is charged, whereby the charge in the time constant capacitor C5 in the timer circuit 38 is discharged through the transistor Q12 and, when the charging of the capacitor C6 is started to turn off the transistor Q12, the capacitor C5 is charged through the resistor R24. Therefore, the transistor Q11 in the timer circuit 38 is turned off immediately after the closing of the trigger switch $SW_T$ but thereafter, when the charging potential of the capacitor C5 reaches the conduction level of the transistor Q11, the transistor Q11 changes from its OFF state to its ON state and after all, a signal assuming a high level (the output voltage level of the constant voltage circuit 10) from after the camera trigger until the lapse of a predetermined time T, as shown in FIGS. 9A and 10A, occurs at the collector side of the transistor Q11, namely, at the output terminal a of the timer circuit 38. The then output of the timer circuit 38 is imparted to the base of the transistor Q13 in the OR circuit 41 through the resistor R30 and the diode D4, whereby the transistor Q13 is in its ON state for this time so that the transistor Q14 is in its OFF state for this time and therefore, a signal assuming a high level (the output voltage level of the constant voltage circuit 10 which is sufficient to hold the transistors Q3, Q4 and Q9 in their ON state) for the predetermined time T set by the timer circuit 38 as shown in FIG. 9D occurs at the collector side of the transistor Q14, namely, at the output terminal d of the OR circuit 41.

The above-described operation continues until lapse of the time T set by the timer circuit 38 after the camera trigger, but here in what filming mode the camera executes the filming operation depends on whether or not the phototransistor PQ is caused to effect ON-OFF. That is, when power is supplied to the circuit system of FIG. 8 by the closing of the trigger switch $SW_T$, the light-emitting diode LD emits light and therefore a light beam is projected from the totally reflecting surface 32a of the light guide 32 toward the sound film path in the cartridge loading chamber 34 and, if it is assumed that the silent film cartridge $CS_i$ is used as the film cartridge, the phototransistor PQ is in its ON state at all times because the projected light beam from the light guide 32 always impinges on the phototransistor PQ during the use of the silent film cartridge $CS_i$, whereby the potential at the junction b between the phototransistor PQ and the resistor R27 assumes a high level (the output voltage level of the constant voltage circuit 10) at all times as shown in FIG. 9B, so that the transistor Q2 in the speed setting circuit 16 is held in ON state as shown in FIG. 9F and after all, the resistor R9 remains connected to the resistor R8. On the other hand, when no variation occurs in the potential at the junction b, the output of the rectifying-integrating circuit 40 assumes zero level as shown in FIG. 9C and accordingly, the output of the OR circuit 41, as shown in FIG. 9D, assumes high level by the high output of the timer circuit 38 following the camera trigger and until the lapse of the predetermined time T, but after the lapse of the predetermined time T, the output of the timer circuit 38 drops to zero level so that the transistor Q13 is turned off to thereby turn on the transistor Q14 and after all, the output of the OR circuit 41 drops to zero level with the lapse of the predetermined time T.

Therefore, during the use of the silent film cartridge $CS_i$, the transistor Q3 in the speed setting circuit 16 keeps its ON state as shown in FIG. 9E until the time T has elapsed, so that both of the resistors R9 and R10 are connected to the resistor R8, whereby the rotational speed of the film transport pawl driving motor M1 is controlled to the level corresponding to the film transport speed of 20 frames/sec. but when the time T has elapsed, the transistor Q3 is turned off as shown in FIG. 9E, so that the connection of the resistor R10 is broken and only the resistor R9 is connected to the resistor R8, whereby the rotational speed of the motor M1 is controlled to the level corresponding to the film transport speed of 18 frames/sec. During the use of the silent film cartridge $CS_i$, the film transport speed at the exposure station is 20 frames/sec. until the predetermined time T set by the timer circuit 38 has elapsed and in the meantime, the transistors Q8–Q10 are turned on by the output of the OR circuit 41 so that the capstan driving motor M2 and the recording circuit 18 become operative but, when the time T has elapsed, the film transport speed at the exposure station becomes constant at 18 frames/sec. suited for the use of the silent film cartridge $CS_i$ and at this point of time, the transistors Q8–Q10 are turned off to render inoperative both of the capstan driving motor M2 and the recording circuit 18 and after all, the camera executes the filming operation in the silent filming mode (see FIG. 9G).

In contrast to this, when the second film cartridge $CS_o$ is used as the film cartridge, the light beam impinging on the phototransistor PQ is intermittently intercepted by the film $FS_o$ as the result of the intermittent transport of the film effected by the film transport pawl 1 at the exposure station, so that the phototransistor PQ is turned on and off, whereby as shown in FIG. 10B, the potential at the junction b between the phototransistor PQ and the resistor R27 is repetitively varied between high level and zero level and accordingly, in this case, a signal having such a waveform as shown in FIG. 10C is emitted from the rectifying-integrating circuit 40 for the then output of the DC blocking capacitor C7. Therefore, by selecting the circuit constant such that the output level of the rectifying integrating circuit 40 is not decreased below the conduction level of the transistor Q13 in the OR circuit 41 during the time from after the output of the capacitor C7 has been changed from the positive to the negative for the variation between the positive and the negative of the output of the capacitor C7 resulting from the ON-OFF of the phototransistor PQ until the output of the capacitor C7 again changes to the positive, the transistor Q13 keeps its ON state by the output of the rectifying integrating circuit 40 being imparted to the base thereof through the resistor R31 and the diode D5 even after the output of the timer circuit 38 has dropped to zero level and after all, by this the output of the OR circuit 41 continues to assume high level, as shown in FIG. 10D, as long ON-OFF of the phototransistor PQ takes place even after the lapse of the predetermined time set by the timer circuit 40.

Therefore, during the use of the sound film cartridge $CS_o$, in the speed setting circuit 16, the output of the OR circuit 41 continues to assume high level so that, as shown in FIG. 10E, the transistor Q3 is held in its ON state and the resistor R30 remains connected to the resistor R8 while, on the other hand, the transistor Q2 is turned on and off by ON-OFF of the phototransistor PQ as shown in FIG. 10F, so that the connection of the resistor R9 to the resistor R8 is intermittently interrupted and after all, the rotational speed of the film transport pawl driving motor M1 is changed over between the two levels corresponding to the film transport speeds of 16 frames/sec. and 20 frames/sec. That is, when the phototransistor PQ is turned off by increased film loop length, the transistor Q2 is turned off to cut off the connection of the resistor R9, so that the rotational speed of the motor M1 is controlled to the level corresponding to the film transport speed of 16 frames/sec. to decrease the film loop length and on the other hand, when the phototransistor PQ is turned on by decreased film loop length, the transistor Q2 is turned on and the resistor R9 is connected, so that the rotational speed of the motor M1 is controlled to the level corresponding to the film transport speed of 20 frames/sec. to increase the film loop length.

Thus, during the use of the sound film cartridge $CS_o$, the film transport speed at the exposure station is changed over between 16 frames/sec. and 20 frames/sec. in accordance with increase and decrease of the film loop length and the transistors Q8–Q10 are held in their ON state by the then output of the OR circuit 41, so that the capstan driving motor M2 and the recording circuit 18 are held in their operative conditions even after the lapse of the aforementioned time T and after all, the camera executes the filming in the sound filming mode (see FIG. 10G).

In the second embodiment of the present invention, the silent filming using the silent film cartridge $CS_i$ and the sound filming using the sound film cartridge $CS_o$ are carried out in the manner described above.

In the first and second embodiments described above, the speed setting circuit for the film transport pawl driving motor M1 is constructed such that three different rotational speeds corresponding to the three different film transports speeds of 18 frames/sec, 16 frames/sec. and 20 frames/sec. are set by selective connection of two resistors R9 and R10 to one resistor R8 but in such construction, it is relatively cumbersome to determine the resistance values of the three resistors R8, R9 and R10. Such cumbersomeness may be eliminated by employing such a construction that three different resistors for setting 18 frames/sec., 16 frames/sec. and 20 frames/sec. are provided and the three different rotational speeds are set by individual selective connection of these three resistors to one resistor. A modification of the second embodiment made from such a point of view will now be described by reference to FIG. 11. FIG. 11 shows the construction of essential portions of the electric circuit system in the present modification which differ from the construction of the circuit system shown in FIG. 8, and those portions not shown in FIG. 11 are quite similar in construction to the electric circuit system of FIG. 8.

In FIG. 11, the circuit block designated by 16' is a speed setting circuit replacing the speed setting circuit 16 in FIG. 8. In the speed setting circuit 16', R36 is a speed setting resistor for controlling, with a resistor R35, the rotational speed of the motor M1 to the level corresponding to the film transport speed of 18 frames/sec., R37 is a speed setting resistor for controlling, also with the resistor R35, the rotational speed of the motor M1 to the level corresponding to the film transport speed of 16 frames/sec., and R38 is a speed setting resistor for controlling, also with the resistor R35, the rotational speed of the motor M1 to the level corresponding to the film transport speed of 20 frames/sec. Q15, Q16 and Q17 are npn transistors for controlling the connection of these resistors R36, R37 and R38 to the resistor R35. Designated by 42 is an inverter connected to the output terminal d of an OR circuit 41. The base of the transistor Q15 is connected to the output terminal of the inverter 42 through a protective resistor R39. Denoted by 43 is an inverter connected to the junction b between the phototransistor PQ and the resistor R27, and 44 designates an AND circuit for receiving the output of the inverter 43 and the output of the OR circuit 41. The base of the transistor Q16 is connected to the output terminal of the AND circuit 44 through a protective resistor R40. Denoted by 45 is an AND circuit for receiving the voltage at the junction b between the phototransistor PQ and the resistor R27 and the output of the OR circuit 41. The base of the transistor Q17 is connected to the output terminal of the AND gate 45 through a protective resistor R41.

In the present modification, the speed setting circuit 16' having the construction as described above is provided in place of the speed setting circuit 16 shown in FIG. 8.

In such a construction, where the silent film cartridge $CS_i$ is used, the potential at the junction b between the phototransistor PQ and the resistor R27 is always at high level (see FIG. 9B) as already noted and on the other hand, the output of the OR circuit 41 assumes high level until a predetermined time T has elapsed after camera trigger but is decreased to zero level with the lapse of the time T (see FIG. 9D), so that in the speed setting circuit 16', only the output of the AND circuit 45 assumes high level until the time T elapses after the camera trigger, and the output of the inverter 42 and the output of the AND circuit 44 have become low level, and with the lapse of the time T, the output of the AND gate 45 changes from high level to low level while, on the other hand, the output of the inverter changes from low level to high level and thus, until the lapse of the time T after the camera trigger, the transistors Q15 and Q16 remain in OFF state while the transistor Q17 is turned on, so that only the resistor R38 is connected to the resistor R35 and after all, in the meantime, the rotational speed of the motor M1 is set to the level corresponding to the film transport speed of 20 frames/sec., but when the time T has elapsed, the transistor Q17 is turned off while the transistor Q15 is turned on, so that the resistor R36, instead of the resistor R38, is connected to the resistor R35 and after all, the rotational speed of the motor M1 becomes controlled to the level corresponding to the film transport speed of 18 frames/sec. and thus, the camera executes the filming in the silent filming mode.

Next, where the sound film cartridge $CS_o$ is used, as noted above, the potential at the aforementioned junction b is repetitively varied between high level and zero level with ON-OFF of the phototransistor PQ (see FIG. 9B) while the output of the OR circuit 41 always continues to assume high level (see FIG. 9D), so that in the speed setting circuit 16', the output of the inverter 42 is always at low level while the outputs of the AND circuits 45 and 44 alternately repeat high-low with the ON-OFF of the phototransistor PQ. That is, when the phototransistor PQ is in ON state, the output of the AND circuit 45 assumes high level while the output of the AND circuit 44 assumes low level, and when the phototransistor PQ is in OFF state, the output of the AND circuit 45 assumes low level while the output of the AND gate 44 assumes high level and therefore, when the phototransistor PQ is in ON state, only the transistor Q17 is turned on so that only the resistor P38 is connected to the resistor R35 and after all, the rotational speed of the motor M1 is set up to the level corresponding to the film transport speed of 20 frames/sec. and on the other hand, when the phototransistor PQ is in OFF state, only the transistor Q16 is turned on so that only the resistor R37 is connected to the resistor R35 and after all, the rotational speed of the motor M1 is set to the level corresponding to the film transport speed of 16 frames/sec. and thus, the camera executes the filming in the sound filming mode.

In this modification, silent filming using the silent film cartridge CS$_i$ and sound filming using the sound film cartridge CS$_o$ are carried out in the manner described above.

While description has hitherto been made of some embodiments of the present invention which seem to be preferable, the invention is not restricted to such embodiments but various other modifications may be made in the embodiments of the present invention.

What we claim is:

1. A sound motion picture camera for use with a film, comprising:
   (A) trigger means for triggering the camera, said trigger means producing a trigger signal during the camera triggering;
   (B) an exposure aperture for exposing the film to scene lights;
   (C) first film transport means for transporting the film for filming near said exposure aperture;
   (D) sound recording means for recording sound signals on the film, said sound recording means being disposed at a location remote from said exposure aperture;
   (E) second film transport means for transporting the film for sound recording near said sound recording means;
   (F) loop detecting means for detecting a variation in the film loop length formed between said exposure aperture and said sound recording means, said loop detecting means producing a first signal representing an increase in film loop length when it detects an increase therein over a predetermined loop length and producing a second signal during the other time;
   (G) signal output means capable of responding to both the trigger signal produced by said trigger means and the first signal produced by said loop detecting means, said signal output means producing a third signal in response to the trigger signal from said trigger means until at least a predetermined time elapses after camera trigger and when said first and second signals are alternately emitted by said loop detecting means after camera trigger, said signal output means being responsive thereto to continue to emit said third signal even after the lapse of said predetermined time; and
   (H) film transport speed control means for controlling the film transport speed of said first film transport means in accordance with the first and second signals produced from said loop detecting means and the third signal emitted by said signal output means, said transport speed control means being capable of selecting the film transport speed of said first film transport means from among a first transport speed corresponding to the film transport speed to be set to said second film transport means, a second transport speed higher than said first transport speed and a third transport speed lower than said first transport speed, and selecting said second transport speed when it receives both the third signal from said signal output means and the second signal from said loop detecting means, selecting said third transport speed when it receives both the third signal from said signal output means and the first signal from said loop detecting means, and selecting said first transport speed when it receives only the second signal from said loop detecting means.

2. A sound motion picture camera according to claim 1, wherein said signal output means includes:
   first circuit means capable of responding to the trigger signal from said trigger means and the first and second signals from said loop detecting means, said first circuit means emitting a fourth signal in response to the trigger signal from said trigger means until at least a predetermined time elapses, and emitting a fifth signal when it receives the second signal from said loop detecting means after the lapse of said predetermined time, and emitting said fourth signal when it receives said first signal; and
   a second circuit means coupled to said first circuit means to emit said third signal, said second circuit means emitting said third signal as long as it receives the fourth signal from said first circuit means;
   said film transport speed control means being electrically coupled to said second circuit means and said loop detecting means to select the film transport speed of said first film transport means from among said first, second and third transport speeds in accordance with the third signal emitted by said second circuit means and said first and second signals produced by said loop detecting means.

3. A sound motion picture camera according to claim 2, wherein said first signal emitted from said loop detecting means has a first predetermined voltage level, said second signal has a second predetermined voltage level higher than said first voltage level, and said first circuit means includes:
   a first circuit for emitting a signal which is gradually decreased from a third predetermined voltage level higher than said second voltage level to a fourth predetermined voltage level lower than said second voltage level but higher than said first voltage level, said first circuit being capable of responding to the trigger signal from said trigger means to start emitting said signal; and
   a second circuit for comparing the voltage level of the output signal from said first circuit with the voltage level of the output signal from said loop detecting means, said second circuit being electrically coupled to said first circuit and said loop detecting means to emit a fourth signal when the voltage level of the output signal from said first circuit is higher than the voltage level of the output signal from said loop detecting means, and to emit said fifth signal when the voltage level of the output signal from said first circuit is lower than the voltage level of the output signal from said loop detecting means;
   said second circuit means being electrically coupled to said second circuit to emit said third signal as long as it receives the fourth signal from said second circuit.

4. A sound motion picture camera according to claim 3, wherein said first circuit is a CR charging circuit whose output voltage is gradually decreased from said third voltage level to said fourth voltage level in response to the trigger signal from said trigger means.

5. A sound motion picture camera according to claim 4, wherein said second circuit is a voltage comparator which receive the output voltage of said CR charging circuit at its non-inversion input and the output signal of said loop detecting means at its inversion input to thereby emit said fourth and fifth signals.

6. A sound motion picture camera according to claim 5, wherein said second circuit means is a rectifying-integrating circuit adapted to rectify and integrate the output of said comparator to thereby emit said third signal.

7. A sound motion picture camera according to claim 1, wherein said signal output means includes:
- a first circuit responsive to the trigger signal from said trigger means to emit a fourth signal until said predetermined time has elapsed after camera trigger;
- a second circuit responsive to first and second signals from said loop detecting means, only when these signals are alternately emitted, to emit a fifth signal, said second circuit being electrically coupled to said loop detecting means to continue to emit said fifth signal as long as said first and second signals are emitted from said loop detecting means; and
- a third circuit for taking the logic sum of said fourth signal from said first circuit and said fifth signal from said second circuit to thereby emit said third signal, said third circuit being electrically coupled to said first and second circuits;
- said film transport speed control means being electrically coupled to said third circuit and said loop detecting means to select the film transport speed of said first film transport means from among said first, second and third transport speed in accordance with said third signal emitted by said third circuit and said first and second signals produced by said loop detecting means.

8. A sound motion picture camera according to claim 7, wherein said first circuit is a timer circuit which is responsive to the trigger signal from said trigger means to emit said fourth signal until said predetermined time has elapsed after camera trigger.

9. A sound motion picture camera according to claim 8, wherein said second circuit is a rectifying-integrating circuit adapted to rectify and integrate the output of said loop detecting means to thereby emit said fifth signal.

10. A sound motion picture camera according to claim 9, wherein said third circuit is an OR logic circuit which takes the OR logic of the fourth signal from said first circuit and the fifth signal from said second circuit to thereby emit said third signal.

11. A sound motion picture camera according to claim 7 wherein said film transport speed control means includes:
- a logic circuit capable of responding to the third signal emitted by said third circuit and the first and second signals, produced by said loop detecting means, said logic circuit being electrically coupled to said third circuit and said loop detecting means to produce a sixth signal when it receives both the third signal from said third circuit and the second signal from said loop detecting means, to produce a seventh signal when it receives both the third signal from said third circuit and the first signal from said loop detecting means, and to produce an eighth signal when it receives only the second signal from said loop detecting means;
- a film transport speed setting circuit for setting the film transport speed of said first film transport means, said setting circuit being capable of selecting the film transport speed of said first film transport means from among said first, second and third transport speeds, said setting circuit being electrically coupled to said logic circuit to set the film transport speed of said first film transport means to said second transport speed when said sixth signal is emitted by said logic circuit, to set the film transport speed of said first film transport means to said third transport speed when said seventh the signal is put out by said logic circuit, and to set the film transport speed of said first film transport means to said first transport speed when said eighth signal is emitted by said logic circuit; and
- a speed control circuit for controlling the operation of said film transport means so that the film transport speed of said first film transport means is the speed set by said speed setting circuit, said speed control circuit being electrically coupled to said speed setting circuit and said first film transport means.

12. A sound motion picture camera according to claim 1, wherein said loop detecting means includes:
- a detecting switch adapted to be actuated by an increase in film loop when the film loop is increased over said predetermined loop amount, said detecting switch producing said first signal when actuated by the increase in film loop and to produce said second signal during the other time;
- said signal output means being electrically coupled to said detecting switch to continue to emit said third signal in response to said first and second signals when these signals are alternately produced by said detecting switch;
- said film transport speed control means being electrically coupled to said signal output means and said detecting switch to select the film transport speed of said first film transport means from among said first, second and third transport speeds in accordance with the third signal from said signal output means and the first and second signal from said detecting switch.

13. A sound motion picture camera according to claim 12, wherein said detecting switch is a normally closed switch adapted to be opened by an increase in film loop when the film loop is increased over said predetermined loop amount;
- said signal output means continues to emit said third signal in response to alternate opening and closing of said switch when it repeats alternate opening and closing;
- said film transport speed control means selects said second transport speed when it receives the third signal from said signal output means and when said switch is closed, selects said third transport speed when it receives the third signal from said signal output means and when said switch is opened, and selects said first transport speed when the third signal from said signal output means is cut off and when said switch is closed.

14. A sound motion picture camera according to claim 1, wherein said loop detecting means includes:
- a radiation projector for projecting a radiation beam having a characteristic which does not sensitize the film toward a portion of a film path leading from said exposure aperture to said sound recording means; and
- a radiation sensor disposed at such a position that the incidence of the radiation beam from said radiation projector is cut off when the film loop is increased over said predetermined loop amount, said radiation sensor being capable of sensing the radiation beam projected from said radiation projector and producing said second signal when it receives said radiation beam and producing said first signal when it does not receive said radiation beam;

said signal output means being electrically coupled to said radiation sensor to continue to emit said third signal in response to the first and second signals when these signals are alternately produced by said sensor;

said film transport speed control means being electrically coupled to said signal output means and said radiation sensor to select the film transport speed of said first film transport means from among said first, second and third transport speeds in accordance with the third signal from said signal output means and the first and second signal from said sensor.

15. A sound motion picture camera according to claim 14, wherein said radiation sensor is disposed at such a position with respect to said radiation projector with said film path interposed therebetween that the incidence of the radiation beam from said radiation projector is cut off when the film loop is increased over said predetermined loop amount.

16. A sound motion picture camera according to claim 15, wherein said radiation sensor has a switching characteristic that it is turned on when it receives the radiation beam from said radiation projector;

said signal output means continues to emit said third signal in response to alternate turn-off and turn-on of said radiation sensor when it repeats alternate turn-off and turn-on;

said film transport speed control means selects said second transport speed when it receives the third signal from said signal output means and when said sensor is turned on, selects said third transport speed when it receives the third signal from said signal output means and when said sensor is turned off, and selects said first transport speed when the third signal from said signal output means is cut off and when said sensor is turned on.

17. A sound motion picture camera according to claim 16, wherein said radiation projector includes a light-emitting diode emitting an infrared light beam, and said radiation sensor is a phototransistor capable of sensing the infrared light beam emitted from said light-emitting diode.

18. A sound motion picture camera according to claim 1, wherein said first film transport means includes:

a film pull-down pawl member for intermittently transporting the film for the filming, said pawl member being disposed adjacent to said exposure aperture;

a driving motor for driving said pawl member, said motor being operatively coupled to said pawl member;

and wherein said film transport speed control means includes:

a film transport speed setting circuit for setting the film transport speed of said pawl member, said speed setting circuit being capable of selecting the film transport speed of said pawl member from among said first, second and third transport speeds and responding to the third signal from said signal output means and the first and second signals from said loop detecting means, said speed setting circuit setting the film transport speed of said pawl member to said second transport speed when it receives both the third signal from said signal output means and the second signal from said loop detecting means, setting the film transport speed of said pawl member to said third transport speed when it receives both the third signal from said signal output means and the first signal from said loop detecting means, and setting the film transport speed of said pawl member to said first transport speed when it receives only the second signal from said loop detecting means; and a motor control circuit for controlling the rotational speed of said driving motor so that the film transport speed of said pawl member is the speed set by said speed setting circuit, said motor control circuit being electrically coupled to said speed setting circuit and said driving motor to control the power supply to said motor and thereby control the rotational speed of said motor.

19. A sound motion picture camera according to claim 1, further comprising:

control means for controlling the operation and non-operation of said second film transport means in accordance with the third signal from said signal output means, said control means being electrically coupled to said signal output means and said second film transport means to set said second film transport means to its operable state when said third signal is emitted by said signal output means.

20. A sound motion picture camera according to claim 19, wherein said second film transport means includes:

a capstan for continuously transporting the film for the sound recording, said capstan being disposed adjacent to said sound recording means; and a driving motor for driving said capstan, said driving motor being operatively coupled to said capstan;

said control means being electrically coupled to said driving motor to set the motor to its operable state when said third signal is emitted by said signal output means.

21. A sound motion picture camera according to claim 20, further comprising:

audio circuit means for imparting to said sound recording means the sound signals to be recorded on the film, said audio circuit means being electrically coupled to said sound recording means; and control means for controlling the operation and non-operation of said audio circuit means in accordance with the third signal from said signal output means, said control means being electrically coupled to said audio circuit means to set said audio circuit means to its operable state when the third signal is emitted by said signal output means.

22. A sound motion picture camera according to claim 1, further comprising:

audio circuit means for imparting to said sound recording means the sound signals to be recorded on the film, said audio circuit means being electrically coupled to said sound recording means; and control means for controlling the operation and non-operation of said audio circuit means in accordance with the third signal from said signal output means, said control means being electrically coupled to said audio circuit means to set said audio circuit means to its operable state when the third signal is emitted by said signal output means.

23. A sound motion picture camera for use with a film, comprising:

(A) trigger means for triggering the camera;

(B) an exposure aperture for exposing the film to scene lights;
(C) first film transport means for transporting the film for filming near said exposure aperture;
(D) sound recording means for recording sound signals on the film, said sound recording means being disposed at a location remote from said exposure aperture;
(E) second film transport means for transporting the film for sound recording near said sound recording means;
(F) film transport speed control means for controlling the film transport speed of said first film transport means, said speed control means being changeable over between a first control mode for controlling the film transport speed of said first film transport means so that the film transport speed of said first film transport means is constant and a second control mode for changeable controlling the film transport speed of said first film transport means so that the amount of the film loop formed between said exposure aperture and said sound recording means is maintained substantially at a predetermined loop amount, said second control mode having a sub-mode for setting at least, the film transport speed of said first film transport means to a transport speed higher than the film transport speed of said second film transport means to increase the film loop;
(G) mode control means for determining the speed control mode of said film transport speed control means, said mode control means including:
(G-1) timer means for setting the time for holding said film transport speed control means in said sub-mode in response to said trigger means;
(G-2) loop detecting means for detecting a variation in film loop formed between said exposure aperture and said sound recording means; and
(G-3) control circuit means capable of responding to both of said timer means and said loop detecting means, said control circuit means setting said film transport speed control means to said sub-mode within said time set by said timer means after camera trigger, and setting said speed control means to said second control mode when said loop detecting means detects a variation in film loop length during said time, and setting said speed control means to said first control mode with the lapse of the time set by said timer means when said loop detecting means does not detect a variation in film loop length.

24. A motion picture camera comprising:
(A) first film transport means for transporting a film for filming through a film exposure station;
(B) second film transport means for transporting a film for sound recording through a sound recording station remote from said film exposure station;
(C) loop detecting means for detecting a change in a film loop length formed between said film exposure station and said sound recording station;
(D) first means for controlling the film transport operation of said first film transport means, said first means being selectively operable in a first control mode for changing the film transport speed of the first film transport means so that said film loop length is adjusted to a predetermined length for synchronous sound filming and a second control mode for stabilizing the film transport speed of the first film transport means to a predetermined speed suited for silent filming; and
(E) second means for controlling the operation of said first means, said second means being coupled to said loop detecting means and setting the first means in the first control mode when the loop detecting means responds to the change in the film loop length while setting the first means in the second control mode when the loop detecting means does not detect the film loop.

25. A motion picture camera according to claim 24, further comprising third means for compulsorily setting said first means in the first control mode until at least a predetermined time elapses after the initiation of the filming operation of the camera.

26. A motion picture camera according to claim 25 wherein said second means is coupled to said third means to control said first means in cooperation with said third means.

27. A motion picture camera according to claim 26, further comprising:
fourth means for controlling the operation of said second film transport means, said fourth means being coupled to said second means and serving to maintain said second film transport means in operative state when said first means is set in the first control mode.

28. A motion picture camera according to claim 27, further comprising:
sound recording means for recording sound signals on a film passing through said sound recording station; and
fifth means for controlling the operation of said sound recording means, said fifth means being coupled to said second means and serving to maintain said sound recording means in operative state when said first means is set in the first control mode.

29. A motion picture camera according to claim 26, further comprising:
sound recording means for recording sound signals on a film passing through said sound recording station; and
sound recording operation control means for controlling the operations of said second film transport means and said sound recording means, said control means being coupled to said second means and serving to maintain said second film transport means and said sound recording means in operative state, respectively, when said first means is set in the first control mode.

30. A motion picture camera according to claim 25, further comprising:
logic means coupled to said first, second, and third means for causing said second and third means to cooperate with said first means.

31. A motion picture camera according to claim 30, further comprising:
fourth means for controlling the operation of said second film transport means, said fourth means being coupled to said logic means and serving to maintain said second film transport means in operative state when said first means is set in the first control mode.

32. A motion picture camera according to claim 31, further comprising:
sound recording means for recording sound signals on a film passing through said sound recording station; and fifth means for controlling the operation of said sound recording means, said fifth means being coupled to said logic means and serving to maintain said sound recording means in operative state when said first means is set in the first control mode.

33. A motion picture camera according to claim 30, further comprising:
sound recording means for recording sound signals on a film passing through said sound recording station; and
sound recording operation control means for controlling the operations of said second film transport means and said sound recording means, said control means being coupled to said logic means and serving to maintain said second film transport means and said sound recording means in operative state, respectively, when said first means is set in the first control mode.

34. A motion picture camera according to claim 24, further comprising:
control means for controlling the operation of said second film transport means, said control means being coupled to said second means and serving to maintain said second film transport means in operative state when said first means is set in the first control mode.

35. A motion picture camera according to claim 34, further comprising:
sound recording means for recording sound signals on a film passing through said sound recording station; and
control means for controlling the operation of said sound recording means, said control means being coupled to said second means and serving to maintain said sound recording means in operative state as far as said first means is set in the first control mode.

36. A motion picture camera according to claim 24, further comprising:
sound recording means for recording sound signals on a film passing through said sound recording station; and
sound recording operation control means for controlling the operations of said second film transport means and said sound recording means, said control means being coupled to said second means and serving to maintain said second film transport means and said sound recording means in operative state, respectively, as far as said first means is set in the first control mode.

37. A motion picture camera according to anyone of claims 24 to 36, wherein said first means is coupled to said loop detecting means in the first control mode to control the film transport speed of said first film transport means in response to the change in the film loop length.

38. A motion picture camera comprising:
(A) first film transport means for transporting a film for filming through film exposure station;
(B) second film transport means for transporting a film for sound recording through sound recording station remote from said film exposure station;
(C) loop detecting means for detecting a change in a film loop length formed between said film exposure station and said sound recording station;
(D) first means for controlling the film transport operation of said first film transport means, said first means being selectively operable in a first control mode for changing the film transport speed of the first film transport means so that said film loop length is adjusted to a predetermined length for synchronous sound filming and a second control mode for stabilizing the film transport speed of the first film transport means to a predetermined speed suited for silent filming;
(E) means for initiating the filming operation of the camera; and
(F) sound means responsive to said initiating means for controlling the operation of said first means, said second means being coupled to said loop detecting means and setting the first means in the first control mode when the loop detecting means responds to the change in the film loop length while setting the first means in the second control mode when the loop detecting means never detects the film loop, and further said second means compulsorily setting said first means in the first control mode until at least a predetermined time elapses after the initiating of filming operation of the camera.

39. A motion picture camera comprising:
(A) an exposure aperture for exposing a film to scene lights;
(B) sound recording means for recording sound signals on a film, said sound recording means being disposed at a location remote from said exposure aperture;
(C) loop detecting means for detecting a change in a film loop length formed between said exposure aperture and said sound recording means;
(D) film transport means operable for transporting a film for both sound filming and silent filming with different operation modes, said transporting means being coupled to said loop detecting means and when set to first one of said different operation modes, being changeable the film transport condition so that said film loop length is adjusted to a predetermined length; and
(E) control means for controlling the operation of said film transport means, said control means coupled to said loop detecting means and when the loop detecting means responds to the change in the film loop length, setting the transport means to said first one of the different operation modes, which first operation mode is suited for normal sound filming, while when the loop detecting means never detects the film loop, setting the transport means to second one of the different operation modes, which second operation mode is suited for normal silent filming.

40. A motion picture camera according to claim 39, further comprising:
means for compulsorily setting said film transport means to said first operation mode until at least a predetermined time elapses after the initiating of filming operation of the camera.

41. A motion picture camera comprising:
(A) an exposure aperture for exposing a film to scene lights;
(B) sound recording means for recording sound signals on a film, said sound recording means being disposed at a location remote from said exposure aperture;
(C) loop detecting means responsive to the change in length of a film loop formed between said exposure aperture and said sound recording means;

(D) film transport means operable for transporting a film for both sound filming and silent filming with different operation modes;

(E) means for initiating the filming operation of the camera; and (F) control means responsive to said initiation means for controlling the operation of said film transport means, said control means being coupled to said loop detecting means and setting said film transport means in a first one of said different operation modes, which first operation mode is suited for normal sound filming, when said loop detecting means responds to the change in the film loop length, while setting said film transport means in a second one of said different operation modes, which second operation mode is suited for normal silent filming, when said loop detecting means never detects the film loop, and further said control means compulsorily setting said film transport means in the first operation until at least a predetermined time elapses after the initiation of filming operation of the camera.

42. In a motion picture camera having a synchronous sound recording system and being selectively operable in either of a sound filming mode and a silent filming mode, a mode control system for automatically determining the operation mode of the camera, comprising:

loop detecting means for detecting a change in a film loop length formed between a film exposure station and a sound recording station of the camera; and control means for determining the operation mode of the camera, said control means being coupled to said loop detecting means and setting the operation mode of the camera to said sound filming mode when the loop detecting means responds to the change in the film loop length while setting the operation mode of the camera to said silent filming mode when the loop detecting means never detects the film loop.

43. In a motion picture camera having a synchronous sound recording system and means for initiating filming operation and being selectively operable in either of sound filming mode and a silent filming mode, a mode control system for automatically controlling the operation mode of the camera, comprising:

loop detecting means for detecting a change in a film loop length formed between a film exposure station and a sound recording station of the camera;

means responsive to said initiation means to compulsorily setting the operation mode of the camera in said sound filming mode until at least a predetermined time elapses after the initiation of the filming operation of the camera; and means responsive to said loop detecting means for determining the operation mode of the camera after the lapse of said predetermined time, said operation mode determining means subsequently setting the operation mode of the camera in said sound filming mode when said loop detecting means responds to the change in the film loop length, while setting the operation mode of the camera in said silent filming mode when said loop detecting means never responds to the change in the film loop.

* * * * *

UNITED STATES PATENT AND TRADEMARK OFFICE
CERTIFICATE OF CORRECTION

PATENT NO. : 4,274,718

DATED : June 23, 1981

INVENTOR(S) : YUTUKA KOHTANI, ET AL.

It is certified that error appears in the above—identified patent and that said Letters Patent is hereby corrected as shown below:

Column 1, line 11, delete "the".

Column 2, line 37, "p" should be --P--.

Column 5, line 26, "abovedescribed" should be --above-described--; line 63, "." should be --,--.

Column 6, line 12, after "station", "." should be --,--; line 14, delete "g".

Column 9, line 34, delete "the"; second occurrence line 46, "." should be --,--.

Column 12, line 12, "continuedly" should be --continually--.

Column 13, line 18, "23a" should be --32a--; line 41, "arrangements" should be --arrangement--; line 45, after "functions" insert --as--.

Column 16, line 32, after "rectifying" insert -- - --; line 41, after "rectifying" insert -- - --; line 44, after "this" insert --,--.

UNITED STATES PATENT AND TRADEMARK OFFICE
CERTIFICATE OF CORRECTION

PATENT NO. : 4,274,718　　　　　　　　　Page 2 of 2
DATED　　　 : June 23, 1981
INVENTOR(S) : YUTUKA KOHTANI, ET AL.

It is certified that error appears in the above—identified patent and that said Letters Patent is hereby corrected as shown below:

Column 17, line 27, after "R8" insert --,--;
line 25, after "sec" insert --.--.
Column 18, line 58, "P38" should be --R38--;
line 61, delete "up".
Column 20, line 65, "receive" should be --receives--
Column 21, line 51, delete --,--.
Column 22, line 6, change "putout" to --emitted--.

IN THE CLAIMS

Column 27, line 51, "anyone" should be --any one--.

Signed and Sealed this

Third Day of November 1981

[SEAL]

Attest:

GERALD J. MOSSINGHOFF

Attesting Officer　　　Commissioner of Patents and Trademarks